United States Patent
Gadre et al.

(10) Patent No.: US 12,517,479 B2
(45) Date of Patent: Jan. 6, 2026

(54) MANUFACTURING EQUIPMENT PARTS QUALITY MANAGEMENT SYSTEM

(71) Applicant: Applied Materials, Inc., Santa Clara, CA (US)

(72) Inventors: Milind Jayram Gadre, San Jose, CA (US); Vivek Bharat Shah, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 693 days.

(21) Appl. No.: 17/558,510

(22) Filed: Dec. 21, 2021

(65) Prior Publication Data

US 2023/0195061 A1    Jun. 22, 2023

(51) Int. Cl.
  G05B 13/04  (2006.01)
  G05B 13/02  (2006.01)
  G05B 19/18  (2006.01)

(52) U.S. Cl.
  CPC ....... G05B 13/048 (2013.01); G05B 13/0265 (2013.01); G05B 19/188 (2013.01); *G05B 2219/40148* (2013.01)

(58) Field of Classification Search
  CPC .......... G05B 13/048; G05B 13/0265; G05B 19/188; G05B 2219/40148; G05B 2219/32201; G05B 19/41875; Y02P 90/02
  See application file for complete search history.

(56) References Cited

U.S. PATENT DOCUMENTS

| | | | |
|---|---|---|---|
| 2003/0009311 A1* | 1/2003 | Ushiku | F04D 19/04 702/184 |
| 2003/0033116 A1* | 2/2003 | Brcka | H01L 21/6831 702/182 |
| 2004/0088068 A1 | 5/2004 | Kadosh | |
| 2005/0143956 A1* | 6/2005 | Long | F04D 15/0088 702/184 |

(Continued)

FOREIGN PATENT DOCUMENTS

| | | |
|---|---|---|
| JP | 2012503339 A | 2/2012 |
| KR | 20050019231 A | 3/2005 |
| WO | 2020159730 A1 | 8/2020 |

OTHER PUBLICATIONS

International Search Report and Written Opinion for International Application No. PCT/US2022/052741, mailed Apr. 7, 2023, 8 Pages.

*Primary Examiner* — Kamini S Shah
*Assistant Examiner* — Mohammed Shafayet
(74) *Attorney, Agent, or Firm* — Lowenstein Sandler LLP

(57) ABSTRACT

A method includes receiving first data indicative of a range of values of a quality parameter of a type of manufacturing chamber component. Each value in the range of values meets one or more threshold criteria. The method further includes providing the first data to a physics-based model of a manufacturing chamber. The method further includes receiving, from the physics-based model, second data indicating a relationship between values of the quality parameter and predicted conditions in the manufacturing chamber. The method further includes determining, based on the relationship between values of the quality parameter and the predicted conditions, whether a new manufacturing chamber component of the manufacturing chamber component type is to be installed in the manufacturing chamber.

18 Claims, 7 Drawing Sheets

(56) References Cited

U.S. PATENT DOCUMENTS

| | | |
|---|---|---|
| 2007/0260350 A1 | 11/2007 | Zagrebnov |
| 2012/0166141 A1 | 6/2012 | Watkins et al. |
| 2014/0031968 A1 | 1/2014 | Baseman et al. |
| 2014/0107828 A1 | 4/2014 | Zhu et al. |
| 2017/0098565 A1* | 4/2017 | Lu .......................... C23C 16/52 |
| 2018/0082826 A1* | 3/2018 | Guha ................ H01J 37/32082 |
| 2018/0136288 A1* | 5/2018 | Wolfe ..................... G01R 31/40 |
| 2019/0198405 A1* | 6/2019 | Li ..................... G05B 19/41875 |
| 2020/0333774 A1* | 10/2020 | Banna ............... H01L 21/67253 |
| 2021/0173011 A1* | 6/2021 | Kajbaf .................... G06F 30/27 |
| 2023/0049157 A1* | 2/2023 | Sawlani ............. G05B 13/0265 |

* cited by examiner

MANUFACTURING EQUIPMENT PARTS QUALITY MANAGEMENT SYSTEM

TECHNICAL FIELD

The instant specification relates to a part management system. Specifically, the instant specification relates to a critical parts quality management system of components of manufacturing equipment.

BACKGROUND

Chambers are used in many types of processing systems. Examples of chambers include etch chambers, deposition chambers, anneal chambers, implant chambers, and the like. Typically, a substrate, such as a semiconductor wafer, is placed on a substrate support within the chamber and conditions in the chamber are set and maintained to process the substrate. The properties of various components of the processing chamber have an effect on the properties of the finished substrate.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one aspect of the disclosure, a method includes receiving first data indicative of a range of values of a quality parameter of a type of manufacturing chamber component. Each value in the range of values meets one or more threshold criteria. The method further includes providing the first data to a physics-based model of a manufacturing chamber. The method further includes receiving, from the physics-based model, second data indicating a relationship between values of the quality parameter and predicted conditions in the manufacturing chamber. The method further includes determining, based on the relationship between values of the quality parameter and the predicted conditions, whether a new manufacturing chamber component of the manufacturing chamber component type is to be installed in the manufacturing chamber.

In another aspect of the disclosure, a non-transitory computer-readable storage medium is disclosed. The non-transitory computer-readable storage medium stores instructions that, when executed by a processing device, cause the processing device to perform operations. The operations include receiving first data indicative of values of one or more quality parameters of one or more manufacturing chamber components installed in a manufacturing chamber. The operations further include receiving second data indicative of a value of a quality parameter of a new manufacturing chamber component, wherein the new manufacturing chamber component is under consideration for installation into the manufacturing chamber. The operations further include providing the first data and the second data to a physics-based model. The operations further include receiving, from the physics-based model, a prediction of performance of the manufacturing chamber with the new manufacturing chamber component installed. The operations further include determining, based on the predicted performance, whether the new manufacturing chamber component is to be installed in the manufacturing chamber.

In another aspect of the present disclosure, a method includes receiving predicted performance data of a manufacturing chamber as output from a physics-based model of the manufacturing chamber. The output of the physics-based model is generated in view of a value of a quality parameter of a component of the manufacturing chamber. The method further includes receiving measured performance data associated with the manufacturing chamber. The method further includes causing performance of a corrective action in view of the predicted performance data and the measured performance data.

BRIEF DESCRIPTION OF THE DRAWINGS

The present disclosure is illustrated by way of example, and not by way of limitation in the figures of the accompanying drawings.

DETAILED DESCRIPTION

Figure 1:
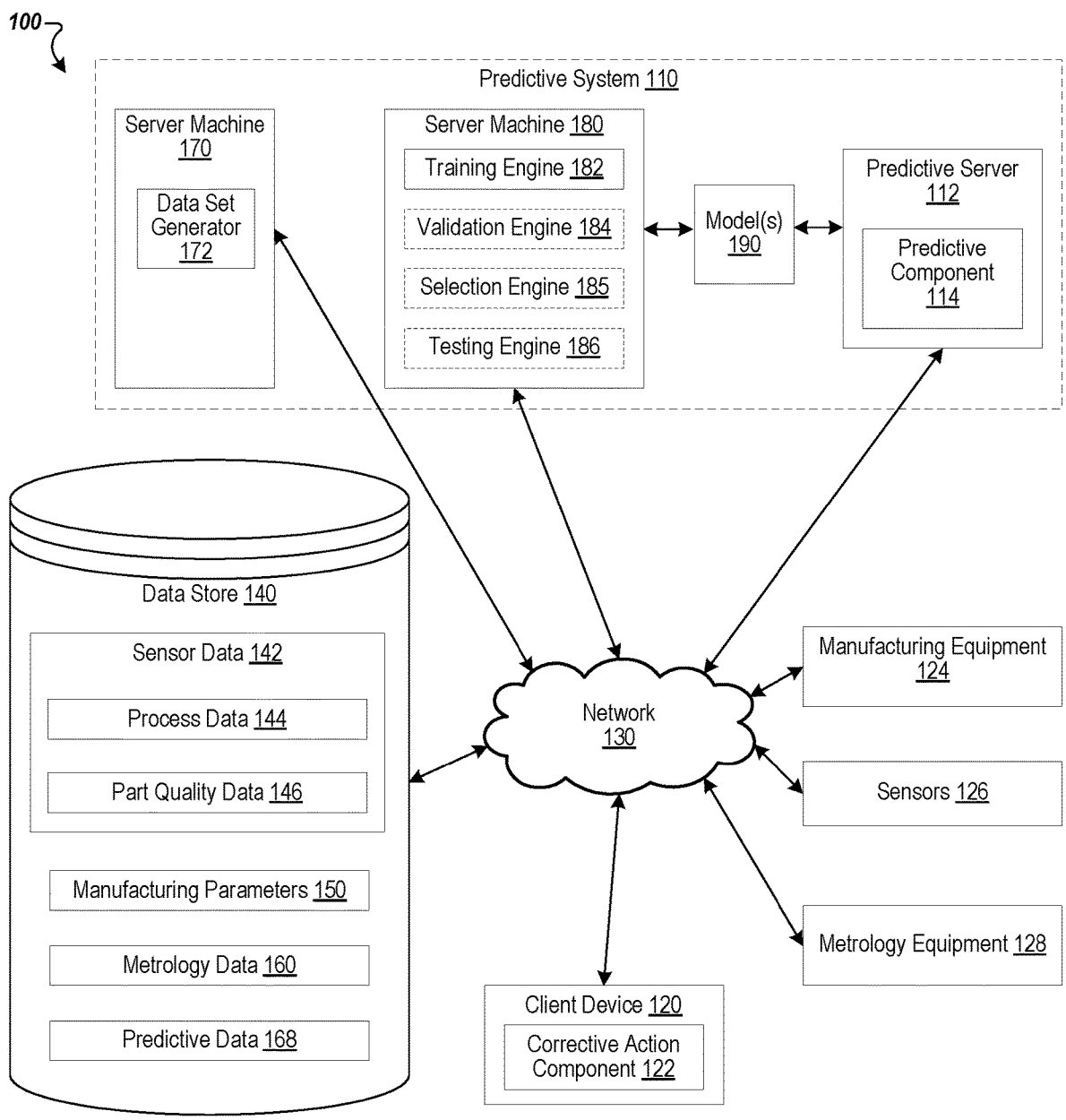
FIG. 1 is a block diagram illustrating an exemplary system (exemplary system architecture), according to some embodiments.

Described herein are technologies directed to utilizing data related to properties of components of processing equipment. Processing equipment (e.g., manufacturing equipment, manufacturing chambers, etc.) may include a number of components. Processing equipment may be used to produce substrates (e.g., semiconductor wafers). The properties of products produced by processing equipment (e.g., wafers) are determined by the conditions in which the substrates were processed. Accurate knowledge of property values at the location of the work piece (e.g., wafer) during operation may be used to predict properties of completed products, consistently produce substrates with the same properties (within a tolerance), and tailor processing parameters to optimize substrate production.

Several components may have an impact on properties in the vicinity of a wafer within a manufacturing chamber. For example, properties of a showerhead, gas manifold, chamber liner, pumping plate, substrate support, process ring, etc. may all contribute to properties proximate to the substrate. Typically, components of processing equipment are manufactured to within a tolerance level. In some cases, parts (components) within manufacturing specifications or tolerances may still exhibit different properties. In some cases, these differences within manufacturing specifications may be sufficient to alter properties at the location of a substrate during processing, and affect properties of the finished substrate. Processing performed using components, even components manufactured within manufacturing specifications, may result in unacceptable performance (e.g., properties of products outside specifications, variance in properties of products above a threshold, etc.).

In conventional systems, determination of the quality of components of manufacturing equipment may be performed empirically. Such an approach may involve extensive experimentation, particularly when one (or a combination) of a number of components may be responsible for the undesirable properties. Experimentation may be costly in terms of time expended, materials used, energy and gasses expended, etc. Additionally, as manufacturing equipment processes successive products, properties of the equipment (and, in some cases, products) tend to drift. Properties may drift as a result of material buildup, aging parts, temperature and gas cycling, alterations during maintenance procedures, and the like. Properties of components which have an impact upon product quality may drift within or outside ranges or properties expected from parts within manufacturing specifications. Any acquired knowledge (e.g., experimentally obtained knowledge) mapping manufacturing equipment performance (e.g., properties of finished products) to the use of particular components, combinations of components, processing parameters, etc., may become invalidated in time due to drift.

A further problem with an experimental approach to component quality is that components may have a finite lifetime. Anytime any component in the chamber is replaced, there is potential that a new period of experimentation will be performed to understand the performance of the new combination of components. In some cases, the properties of consumable parts (e.g., parts replaced frequently) may impact product quality. It may be inconvenient, inefficient, or even impossible to characterize performance of such parts empirically. Attempts to generate a new set of properties inside a manufacturing chamber (e.g., to process a different type of product) may call for further characterizing experimentation.

In one or more embodiments, the methods and devices of the current disclosure address at least some of these deficiencies of the conventional approach. This disclosure enables the use of part quality data of a variety of components installed in manufacturing equipment to determine which parts to install into chambers, when to replace parts, and/or to perform other actions. In some embodiments, utilization of part quality data of components affecting substrate processing in a manufacturing chamber is enabled. In some embodiments, property values of components may be measured to determine values of quality parameters of the components. Quality data of parts (components) may be supplied to a physics-based digital twin model of the manufacturing chamber. One or more parameters of a part may be measured. Parameters of a part that fall within manufacturing specification may be further characterized, with more detail than a determination of whether or not the part falls within manufacturing specifications. Data collected from measuring properties of components may be correlated with performance of the components. For example, various properties of an electrostatic chuck may be measured, such as material properties of the surface, characterization of an engineered roughness of the surface, characterization of heating, RF, or chucking electrodes, etc. Characterization of heating electrodes and/or the surface of the chucking device may be related to heat transfer from the chuck to a substrate. Properties of chucking electrodes may be used to choose parameters for optimal chucking of a substrate, e.g., determining an optimum power for the target chucking strength, determining an optimal rise of power supplied to an electrode to avoid overshoot or manage rise time, etc.

In some embodiments, methods and devices of the current disclosure further include providing data, generated in view of the measurement data of the component(s) of manufacturing equipment, to a physics-based model, such as a digital twin model. As used herein, a digital twin is a digital replica of a physical asset, such as a manufactured part, equipment including multiple manufactured parts, etc. The digital twin includes characteristics of the physical asset, which may include coordinate axis dimensions, weight characteristics, material characteristics (e.g., density, surface roughness, emissivity), electrical characteristics (e.g., conductivity), optical characteristics (e.g., reflectivity), etc. The physics-based model is configured to provide predictions of conditions associated with manufacturing equipment (e.g., conditions within a manufacturing chamber, conditions proximate to a work piece, etc.). The physics-based model may perform calculations related to a variety of properties, such as calculating heat transfer, calculating gas conductance, etc. In some embodiments, methods of the current disclosure further include receiving predicted performance data associated with the components from the physics-based model. The physics-based model may have generated the predicted performance data in view of part quality measurements.

In some embodiments, methods of the present disclosure further include using the predicted performance data of the manufacturing equipment (or components of manufacturing equipment) output by the physics-based model to determine whether a component (or a group of components) is suitable for installation in manufacturing equipment (e.g., a manufacturing or processing chamber). Values of one or more parameters of a component may be found by the physics-based model to have an impact on property values proximate to a work piece (e.g., a substrate, a semiconductor wafer, etc.) associated with the processing equipment. The property values proximate to the work piece may have an impact on process performance (e.g., properties of a finished substrate).

In some embodiments, a process may have process specifications, which may include target values for properties, acceptable tolerances for those properties, etc. Providing measurements of quality parameters to the physics-based model enables the physics-based model to generate predicted performance data of manufacturing equipment incorporating a component described by the quality parameters. The predicted performance data may be used to determine if a component which may be installed as a part of manufacturing or processing equipment is suitable for a process having a set of process specifications (e.g., if the component is capable of producing conditions meeting a target value, if the component is capable of producing conditions consistently within process specification tolerance, etc.). The physics-based model may include part quality metrics for components already installed in the chamber. Potential interactions between quality parameters of multiple components may be described by the physics-based model. Conditions associated with manufacturing equipment (e.g., property values inside a processing or manufacturing chamber) as predicted by the physics-based model may be compared to conditions measured to highlight potential problems, faults, drift, aging, etc., of components of the manufacturing equipment.

In some aspects, the present disclosure enables a method including a processing device receiving first data indicative of a range of values of a quality parameter of a type of manufacturing chamber component. Each value in the range meets one or more first threshold criteria. The method further includes providing the first data to a physics-based model of a manufacturing chamber. The method further includes receiving second data from the physics-based model. The second data indicates a relationship between values of the quality parameter and predicted conditions in the manufacturing chamber. The method further includes determining whether a manufacturing chamber component of the manufacturing chamber component type is to be installed in the manufacturing chamber, based on the predicted conditions.

In another aspect, the present disclosure enables a method including receiving data indicative of values of one or more quality parameters of one or more manufacturing chamber components installed in a manufacturing chamber. The method further includes receiving second data indicative of a value of a quality parameter of a new manufacturing chamber component. The new manufacturing chamber component is under consideration for installation into the manufacturing chamber. The method further includes providing the first data and the second data to a physics-based model. The method further includes receiving, from the physics-based model, a prediction of performance of the manufacturing chamber with the new manufacturing chamber component installed. The method further includes determining whether the new manufacturing chamber component is to be installed in the manufacturing chamber, based on the predicted conditions.

In another aspect, the present disclosure enables a method including receiving predicted performance data of a manufacturing chamber. The predicted performance data is output by a physics-based model. The predicted performance data is output in view of a value of a first quality parameter of a first component of the manufacturing chamber. The method further includes receiving measured performance data associated with the manufacturing chamber. The method further includes causing performance of a corrective action in view of the predicted performance data and the measured performance data.

Aspects of the present disclosure result in technological advantages over conventional methods. Characterization of potential components to be installed in manufacturing equipment may be accomplished by performing measurements and supplying data indicative of those measurements to a physics-based (e.g., digital twin) model. This characterization avoids the expensive conventional method of testing one or more potential components by manufacturing wafers using the components, performing metrology on the wafers, and inferring quality of the components from the metrology. Aspects of the present disclosure also allow for an improved selection process of components to use for a manufacturing process if several nominally equivalent (e.g., manufactured to the same specifications) components are available. Some components may include quality parameters associated with an adjustable metric, e.g., heating elements which may be tuned by providing different amounts of power may differ in performance. In some embodiments, characterization of components may enable tuning of control to generate more favorable processing conditions. Additionally, chamber components may be re-characterized (e.g., during a planned maintenance event) to account for any drift in the component. If a problem with the manufacturing chamber is suspected, components may be re-characterized and either confirmed or ruled out as being responsible.

FIG. 1 is a block diagram illustrating an exemplary system 100 (exemplary system architecture), according to some embodiments. The system 100 includes a client device 120, manufacturing equipment 124, sensors 126, metrology equipment 128, predictive server 112, and data store 140. Predictive server 112 may be part of predictive system 110. Predictive system 110 may further include server machines 170 and 180.

In some embodiments, manufacturing equipment 124 (e.g., cluster tool) is part of a substrate processing system (e.g., integrated processing system). The manufacturing equipment 124 includes one or more of a controller, an enclosure system (e.g., substrate carrier, front opening unified pod (FOUP), autoteach FOUP, process kit enclosure system, substrate enclosure system, cassette, etc.), a side storage pod (SSP), an aligner device (e.g., aligner chamber), a factory interface (e.g., equipment front end module (EFEM)), a load lock, a transfer chamber, one or more processing chambers, a robot arm (e.g., disposed in the transfer chamber, disposed in the front interface, etc.), and/or the like. The enclosure system, SSP, and load lock mount to the factory interface and a robot arm disposed in the factory interface is to transfer content (e.g., substrates, process kit rings, carriers, validation wafer, etc.) between the enclosure system, SSP, load lock, and factory interface. The aligner device is disposed in the factory interface to align the content. The load lock and the processing chambers mount to the transfer chamber and a robot arm disposed in the transfer chamber is to transfer content (e.g., substrates, process kit rings, carriers, validation wafer, etc.) between the load lock, the processing chambers, and the transfer chamber. In some embodiments, manufacturing equipment 124 includes components of substrate processing systems. In some embodiments, manufacturing equipment 124 is used to produce one or more products (e.g., substrates, semiconductors, wafers, etc.). In some embodiments, manufacturing equipment 124 is used to produce one or more components to be used in substrate processing systems. Manufacturing equipment 124 may include a wide array of components. Examples of chamber components may include a substrate support, a chuck (e.g., electrostatic chuck, vacuum chuck, etc.), a ring (e.g., a process kit ring), a chamber wall, a base, a showerhead, a gas distribution plate, a liner, a liner kit, a shield, a plasma screen, a flow equalizer, a cooling base, a chamber viewport, a chamber lid, a nozzle and so on.

Sensors 126 may provide sensor data 142 associated with manufacturing equipment 124 (e.g., associated with producing, by manufacturing equipment 124, corresponding products, such as wafers). Sensors 126 may further include sensors used to measure quality parameters of components of manufacturing equipment 124. Sensor data 142 may be used for equipment health and/or product health (e.g., equipment quality and/or product quality), for example. Manufacturing equipment 124 may produce products following a recipe or performing runs over a period of time. Sensor data 142 may include process data 144 and part quality data 146. Process data may include data associated with processing of products using manufacturing equipment 124, e.g., trace data of sensors associated with manufacturing equipment 124. In some embodiments, process data 144 of sensor data 142 may include values of one or more of temperature (e.g., heater temperature), spacing (SP), pressure, High Frequency Radio Frequency (HFRF), voltage of Electrostatic Chuck (ESC), electrical current, flow (e.g., of one or more gases), power, voltage, etc. Sensor data 142 may include part quality data 146. Part quality data 146 may include data describing properties of components associated with manufacturing equipment 124. Part quality data 146 may include material properties of components, physical parameters, optical parameters, etc. Part quality data 146 may include values of one or more of coordinate axis dimensions (e.g., size and shape of a part, including interior sub-components such as electrodes disposed below the surface of a substrate support), weight characteristics, material characteristics (e.g., density, surface roughness, emissivity), electrical characteristics, optical characteristics, characteristics related to heat transfer, etc. Sensor data 142 may include historical sensor data and current sensor data. Manufacturing equipment 124 may be configured according to manufacturing parameters 150. Manufacturing parameters 150 may be associated with or indicative of parameters such as hardware parameters (e.g., settings or components (e.g., size, type, etc.) of the manufacturing equipment 124) and/or process parameters of the manufacturing equipment. Manufacturing parameters 150 may include historical manufacturing data and/or current manufacturing data. Manufacturing parameters 150 may be indicative of input settings to the manufacturing device (e.g., heater power, gas flow, etc.). Sensor data 142 and/or manufacturing parameters 150 may be provided while the manufacturing equipment 124 is performing manufacturing processes (e.g., equipment readings when processing products). Sensor data 142 may be different for each product (e.g., each wafer may be characterized by unique process data 144, each component may be characterized by unique part quality data 146).

In some embodiments, sensor data 142, metrology data 160, and/or manufacturing parameters 150 may be processed (e.g., by the client device 120 and/or by the predictive server 112). Processing of data may include generating features. In some embodiments, the features are a pattern in the sensor data 142, metrology data 160, and/or manufacturing parameters 150 (e.g., slope, width, height, peak, etc.) or a combination of values from the sensor data 142, metrology data 160, and/or manufacturing parameters 150 (e.g., power derived from voltage and current, etc.). The features may be used by predictive component 114 for performing signal processing and/or for obtaining predictive data 168, possibly for performance of a corrective action. Predictive data 168 may be any data associated with predictive system 110, e.g. predicted performance data of a component of manufacturing equipment 124, predicted performance data of manufacturing equipment 124, predicted metrology data, etc.

Each instance (e.g., set) of process data 144 of sensor data 142 may correspond to a product (e.g., a wafer), a set of manufacturing equipment, a type of substrate produced by manufacturing equipment, a combination thereof, or the like. Each instance of metrology data 160 and manufacturing parameters 150 may likewise correspond to a product, a set of manufacturing equipment, a type of substrate produced by manufacturing equipment, a combination thereof, or the like. The data store may further store information associating sets of different data types, e.g. information indicative that a set of sensor data, a set of metrology data, and/or a set of manufacturing data are all associated with the same product, manufacturing equipment, type of substrate, etc.

Each instance of part quality data 146 of sensor data 142 may correspond to a component of manufacturing equipment, a combination of components, a type of chamber or equipment, or the like. Part quality data 146 may include data associating components of manufacturing equipment 124 to sensor data 142, manufacturing parameters 150, metrology data 160, and/or predictive data 168. For example, a particular component may have been installed in a manufacturing chamber. Sensors 126 may have been used to measure quality parameters of the component. Data store 140 may store data correlating process data 144 collected during processing with the component installed to part quality data 146, data store 140 may store data correlating metrology data 160 of products produced with the component installed to quality data 146, etc.

In some embodiments, predictive system 110 may generate predictive data 168 using physics-based models and/or digital twin models. For example, predicted performance changes of manufacturing equipment if a new component is installed may be generated by supplying part quality data 146 associated with the new component to a physics-based model. Use of physics-based models for generating predictive data is discussed further below, for example in connection with FIGS. 4B-E. In some embodiments, predictive system 110 may generate predictive data 168 using machine learning. For example, data indicative of manufacturing conditions may be provided as input to a trained machine learning model. The machine learning model may provide as output predicted properties of finished products. Use of machine learning models to generate predictive data is discussed in greater detail below, for example in connection with FIG. 3.

Client device 120, manufacturing equipment 124, sensors 126, metrology equipment 128, predictive server 112, data store 140, server machine 170, and server machine 180 may be coupled to each other via a network 130 for generating sensor data 142, metrology data 160, and/or predictive data 168. These data may be used in performing corrective actions.

In some embodiments, network 130 is a public network that provides client device 120 with access to predictive server 112, data store 140, and/or other publically available computing devices. In some embodiments, network 130 is a private network that provides client device 120 access to manufacturing equipment 124, sensors 126, metrology equipment 128, data store 140, and/or other privately available computing devices. Network 130 may include one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

Client device 120 may include a computing device such as Personal Computers (PCs), laptops, mobile phones, smart phones, tablet computers, netbook computers, network connected televisions ("smart TV"), network-connected media players (e.g., Blu-ray player), a set-top-box, Over-the-Top (OTT) streaming devices, operator boxes, etc. Client device 120 may include a corrective action component 122. Corrective action component 122 may receive user input (e.g., via a Graphical User Interface (GUI) displayed via the client device 120) of an indication associated with manufacturing equipment 124. In some embodiments, corrective action component 122 transmits the indication to predictive system 110, receives output (e.g., predictive data 168) from predictive system 110, determines a corrective action based on the output, and causes the corrective action to be implemented.

In some embodiments, predictive system 110 may further include a predictive component 114. Predictive component 114 may take data retrieved from model(s) 190 to generate predictive data 168. In some embodiments, predictive component 114 provides predictive data 168 to client device 120, and client device 120 causes a corrective action via corrective action component 122 in view of predictive data 168. In some embodiments, corrective action component 122 obtains sensor data 142 associated with one or more components of manufacturing equipment 124 (e.g., from data store 140, etc.) and provides the sensor data 142 to predictive system 110.

In some embodiments, corrective action component 122 stores sensor data 142 (e.g., part quality data 146) in data store 140 and predictive server 112 retrieves sensor data 142 from data store 140. In some embodiments, predictive server 112 may store output (e.g., predictive data 168) of the trained model(s) 190 in data store 140 and client device 120 may retrieve the output from data store 140. In some embodiments, corrective action component 122 receives an indication of a corrective action from predictive system 110 and causes the corrective action to be implemented. Each client device 120 may include an operating system that allows users to one or more of generate, view, or edit data (e.g., indication associated with manufacturing equipment 124, corrective actions associated with manufacturing equipment 124, etc.).

Part quality data 146 includes data collected by sensors 126. Part quality data 146 includes measurements of properties of components (parts) associated with manufacturing equipment 124. Properties and parameters included in part quality data 146 may have an effect (or be predicted to have an effect) on conditions proximate to a product (e.g., semiconductor wafer) during processing. Part quality data 146 may be taken as input by predictive system 110 to generate as output predictive data 168. Part quality data 146 may be provided to a physics-based model (e.g., model 190). The physics based model may be or include a digital twin model. The physics-based model may output predictive performance data (e.g., predictive data 168) of the one or more components, predicted performance data of manufacturing equipment 124 with the one or more components installed, predicted performance data of produced products (e.g., predicted metrology data), etc. In some embodiments, components associated with part quality data 146 may have been produced within manufacturing specifications. In some embodiments, part quality data 146 may capture differences between different examples of the same component (e.g., same part number) within the range of manufacturing specifications, operating specifications, etc., for that component.

Predicted property data and metrology data 160 of a corresponding product may be compared by predictive system 110 to output a prediction of a manufacturing fault, chamber component drift, etc., and/or a corrective action. Predictive system 110 may input predicted property data and metrology data 160 into a model (e.g., model 190) to generate data indicative of a corrective action. This model may be a trained machine learning model in some embodiments. In some embodiments, the corrective action may be an update to manufacturing parameters 150 for future substrates to be produced by manufacturing equipment 124.

In some embodiments, metrology data 160 corresponds to historical property data of products (e.g., produced using manufacturing parameters associated with historical sensor data and historical manufacturing parameters) and predictive data 168 is associated with predicted property data (e.g., of products to be produced or that have been produced in conditions recorded by current sensor data and/or current manufacturing parameters). In some embodiments, predictive data 168 is predicted metrology data (e.g., virtual metrology data) of the products to be produced or that have been produced according to conditions recorded as current sensor data and/or current manufacturing parameters. In some embodiments, predictive data 168 is or includes an indication of abnormalities (e.g., abnormal products, abnormal components, abnormal manufacturing equipment, abnormal energy usage, etc.) and/or one or more causes of the abnormalities. In some embodiments, predictive data 168 includes an indication of change over time or drift in some component of manufacturing equipment 124, sensors 126, metrology equipment 128, and the like. In some embodiments, predictive data 168 includes an indication of an end of life of a component of manufacturing equipment 124, sensors 126, metrology equipment 128, or the like.

Performing manufacturing processes that result in defective products can be costly in time, energy, products, components, manufacturing equipment 124, the cost of identifying the defects and discarding the defective product, etc. By inputting part quality data 146 (e.g., measurements of properties of one or more components of manufacturing equipment 124) into one or more physics-based digital twin models (e.g., model(s) 190), receiving output of predictive data 168, and performing a corrective action based on predictive data 168, system 100 can have the technical advantage of avoiding the cost of producing, identifying, and discarding defective products.

Performing manufacturing processes that result in failure of the components of the manufacturing equipment 124 can be costly in downtime, damage to products, damage to equipment, express ordering replacement components, etc. By inputting sensor data 142 (e.g., measurements of properties of one or more components of manufacturing equipment 124) to a physics-based model (e.g., model 190), receiving output of predictive data 168 (e.g., predicted performance of manufacturing equipment 124), comparing results from the same component over time to diagnose drifting or failing components (recorded as predictive data 168), and performing corrective actions (e.g., predicted operational maintenance, such as replacement, processing, cleaning, etc. of components) based on the predictive data 168, system 100 can have the technical advantage of avoiding the cost of one or more of unexpected component failure, unscheduled downtime, productivity loss, unexpected equipment failure, product scrap, or the like. Monitoring the performance over time of components, e.g. manufacturing equipment 124, sensors 126, metrology equipment 128, and the like, may provide indications of degrading components. Monitoring the performance of a component over time may extend the components's operational lifetime, for instance if, after a standard replacement interval passes, measurements indicative that the component may still perform well (e.g., performance above a threshold) for a time (e.g., until the next planned maintenance event).

Manufacturing parameters may be suboptimal for producing products which may have costly results of increased resource (e.g., energy, coolant, gases, etc.) consumption, increased amount of time to produce the products, increased component failure, increased amounts of defective products, etc. By inputting part quality data 146 into a trained physics-based model (e.g., model 190), receiving an output of predictive data 168, and performing (e.g., based on part quality data 146) a corrective action of updating manufacturing parameters (e.g., setting optimal manufacturing parameters), system 100 can have the technical advantage of using optimal manufacturing parameters (e.g., hardware parameters, process parameters, optimal design) to avoid costly results of suboptimal manufacturing parameters.

In some embodiments, a component may be in consideration for installation as part of manufacturing equipment 124. Manufacturing equipment 124 may be used for processing, wherein certain processing parameters are achieved. Part quality data 146 associated with the component may be measured and supplied to a physics-based model. The component may be classified according to parameters achievable in a manufacturing chamber, consistency of achievement of parameters in the chamber, resource cost (e.g., energy, gas, etc.) of achieving target parameters in the chamber, etc. Components may be classified as being appropriate for use (or not appropriate) in one or more manufacturing processes.

In some embodiments, the corrective action includes providing an alert (e.g., an alarm to stop or not perform the manufacturing process if predictive data 168 indicates a predicted abnormality, such as an abnormality of the product, a component, or manufacturing equipment 124). In some embodiments, the corrective action includes providing feedback control (e.g., modifying a manufacturing parameter responsive to the predictive data 168 indicating an abnormality). In some embodiments, the corrective action includes providing machine learning (e.g., modifying one or more manufacturing parameters based on the predictive data 168). In some embodiments, performance of the corrective action includes causing updates to one or more manufacturing parameters.

In some embodiments, the corrective action includes scheduling preventative maintenance. Monitoring of part quality and performance may indicate a time at which a component is to be replaced. Utilizing the output of a physics-based model, for example, may indicate that manufacturing equipment 124 (e.g., a manufacturing chamber) may drift more quickly than other chambers of the same or different type, due to the process performed with the equipment, the component installed in the equipment, adjustments made to process recipes to achieve target parameters, etc. Manufacturing equipment 124 may have a maintenance schedule adjusted based on the output of model(s) 190, based on predictive data 168, etc.

Manufacturing parameters may include hardware parameters (e.g., replacing components, using certain components, replacing a processing chip, updating firmware, etc.) and/or process parameters (e.g., temperature, pressure, flow, rate, electrical current, voltage, gas flow, lift speed, etc.). In some embodiments, the corrective action includes causing preventative operative maintenance (e.g., replace, process, clean, etc. components of the manufacturing equipment 124). In some embodiments, the corrective action includes causing design optimization (e.g., updating manufacturing parameters, manufacturing processes, manufacturing equipment 124, etc. for an optimized product). In some embodiments, the corrective action includes a updating a recipe (e.g., manufacturing equipment 124 to be in an idle mode, a sleep mode, a warm-up mode, etc.).

Predictive server 112, server machine 170, and server machine 180 may each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

Predictive server 112 may include predictive component 114. Predictive component 114 may be used to generate predictive data 168. In some embodiments, predictive component 114 may receive sensor data 142, and/or manufacturing parameters 150 (e.g., receive from the client device 120, retrieve from the data store 140) and generate output for performing corrective action associated with manufacturing equipment 124 based on the current data. In some embodiments, predictive component 114 may use one or more models 190 to determine the output for performing the corrective action based on current data. Model(s) 190 may be a single model, an ensemble model, or a collection of models used to process data. Model(s) 190 may include one or more physics-based digital twin models, supervised machine learning models, unsupervised machine learning models, semi-supervised machine learning models, statistical models, etc.

In some embodiments, data indicative of properties of a substrate to be produced using manufacturing equipment including components characterized by part quality data 146 (e.g., performance associated with predictive data 168 informed by part quality data 146) is provided to a trained machine learning model (e.g., model 190). The machine learning model is trained to output data indicative of a corrective action to produce a substrate with target characteristics. In some embodiments, data indicative of predictive properties of a substrate produced using manufacturing equipment 124 including particular components, and metrology data of a substrate produced with those components are provided as input to a trained machine learning model (e.g., model 190). The trained machine learning model predicts underlying causes for differences between predicted and measured data (e.g., manufacturing fault, component aging or drift, etc.).

Historical sensor data may be used in combination with current sensor data to detect drift, changes, aging, etc. of components of manufacturing equipment 124. Sensor data 142 (including process data 144 measured during operation of manufacturing equipment 124 and part quality data 146 associated with measurement or predictions of values of quality parameters of components associated with manufacturing equipment 124) may be monitored over time. Changes in sensor data 142 over time may generate information indicative of changes in manufacturing equipment. Part quality data 146 may also provide information related to other components of manufacturing equipment 124, e.g., uneven wear on the surface of a substrate support may indicate a problem with robotic handlers placing substrates on the substrate support, rather than a problem with the substrate support itself. Predictive component 114 may use combinations and comparisons of these data types to generate predictive data 168. In some embodiments, predictive data 168 includes data predicting the lifetime of components of manufacturing equipment 124, sensors 126, etc.

Commonly, conventional systems perform little to no characterization of manufacturing equipment components beyond confirming they meet specifications. In some systems, a manufacturer of a component may confirm (e.g., measure, provide documentation, etc.) that a component meets specifications. All components meeting the same specifications (e.g., all components with the same part number) may be considered to be identical. Classification of components as satisfactory or unsatisfactory for use for a particular process, in a particular chamber, etc., may be performed responsive to making measurements of produced substrates and determining the products are satisfactory or unsatisfactory. Characterizing variations between nominally identical parts may be performed empirically. For instance, two nominally identical components may respond differently to supplied voltages, supplied processing parameters, etc. Characterizing such differences may be performed based on sensor data, metrology data of finished products, etc. Characterization of components may allow selection of components suitable for particular processes, selection of components suitable for installation in a particular chamber, tuning of the operation of the component, etc., without the waste associated with producing and measuring substrates.

In some embodiments, predictive component 114 receives data, such as sensor data 142, manufacturing parameters 150, metrology data 160, etc., and may perform pre-processing such as extracting patterns in the data or combining data to new composite data. Predictive component 114 may then provide the data to model(s) 190 as input. Model(s) 190 may include a physics-based (e.g., digital twin) model, accepting as input data indicative of manufacturing equipment component part quality (e.g., part quality data 146). The physics-based model may utilize part quality data 146 to make a prediction of chamber performance. Predictive component 114 may receive from model 190 predictive data. Predictive component 114 may then cause a corrective action to occur. The corrective action may include sending an alert to client device 120. The corrective action may include generating and/or storing predictive data 168, indicative of chamber component drift, aging, or failure.

In some embodiments, model 190 may include a trained machine learning model. Predictive component 114 may provide data to trained machine learning model 190 as input. In some embodiments, model 190 may receive data indicative of processing parameters and quality data of chamber components. Model 190 may generate as output data indicative of predicted properties (e.g., predicted metrology) of products produced using chamber components described by the input quality data. In some embodiments, predictive component 114 may provide as input data to model 190 data indicative of manufacturing parameters, sensor data, maintenance history of the manufacturing equipment, and/or metrology. Output of model 190 may include predicted part quality data of components installed in manufacturing equipment 124. Predicted part quality data may be used to perform a corrective action, such as updating a process recipe, scheduling maintenance, providing an alert to a user, etc.

Data store 140 may be a memory (e.g., random access memory), a drive (e.g., a hard drive, a flash drive), a database system, or another type of component or device capable of storing data. Data store 140 may include multiple storage components (e.g., multiple drives or multiple databases) that may span multiple computing devices (e.g., multiple server computers). The data store 140 may store sensor data 142, manufacturing parameters 150, metrology data 160, and predictive data 168. Sensor data may include process data 144, possibly including sensor data time traces over the duration of manufacturing processes, associations of data with physical sensors, pre-processed data, such as averages and composite data, and data indicative of sensor performance over time (i.e., many manufacturing processes).

Sensor data 142 may include part quality data 146. Part quality data 146 may include data indicative of measurements of one or more quality parameters of one or more components of manufacturing equipment. Part quality data 146 may include data associated with components installed in manufacturing equipment 124 and/or data associated with components not yet installed in manufacturing equipment. Part quality data 146 may include data indicative of component performance. Data indicative of component performance may be generated as output from a model, for example a physics-based (e.g., digital twin) model or a machine learning model. Component performance data may include predictive data of chamber performance with a component installed, performance data of a chamber with a number of components with measured quality parameters installed, etc.

Manufacturing parameters 150 and metrology data 160 may contain similar features to sensor data 142, e.g., pre-processed data, averages, composite data, associations of data with equipment or products, etc. Process data 144, part quality data 146, manufacturing parameters 150, and metrology data may contain historical data (e.g., at least a portion for training various models represented in FIG. 1 by model 190). Metrology data 160 may be metrology data of produced substrates, as well as sensor data, manufacturing data, and model data corresponding to those products. Metrology data 160 may be leveraged to design processes for making further substrates. Predictive data 168 may include predictions of metrology data resulting from operation of manufacturing equipment 124, including manufacturing equipment with components associated with part quality data 146 installed, predictions of component drift, aging, or failure, predictions of component lifetimes, etc. Predictive data 168 may also include data indicative of components of system 100 aging and failing over time.

In some embodiments, predictive system 110 further includes server machine 170 and server machine 180. Server machine 170 includes a data set generator 172 that is capable of generating data sets (e.g., a set of data inputs and a set of target outputs) to train, validate, and/or test model(s) 190. Some operations of data set generator 172 are described in detail below with respect to FIGS. 2 and 4A. In some embodiments, data set generator 172 may partition historical data (e.g., historical sensor data, historical metrology data, etc.) and physical model data (e.g., part quality data 146) into a training set (e.g., sixty percent of the data), a validating set (e.g., twenty percent of the data), and a testing set (e.g., twenty percent of the data). In some embodiments, predictive system 110 (e.g., via predictive component 114) generates multiple sets of features. For example a first set of features may correspond to a first set of types of sensor data (e.g., from a first set of sensors, first combination of values from first set of sensors, first patterns in the values from the first set of sensors) that correspond to each of the data sets (e.g., training set, validation set, and testing set) and a second set of features may correspond to a second set of types of sensor data (e.g., from a second set of sensors different from the first set of sensors, second combination of values different from the first combination, second patterns different from the first patterns) that correspond to each of the data sets.

Server machine 180 includes a training engine 182, a validation engine 184, selection engine 185, and/or a testing engine 186. An engine (e.g., training engine 182, a validation engine 184, selection engine 185, and a testing engine 186) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. Training engine 182 may be capable of training a model 190 using one or more sets of features associated with the training set from data set generator 172. Training engine 182 may generate multiple trained models 190, where each trained model 190 corresponds to a distinct set of features of the training set (e.g., sensor data from a distinct set of sensors). For example, a first trained machine learning model may have been trained using all features (e.g., X1-X5), a second trained machine learning model may have been trained using a first subset of the features (e.g., X1, X2, X4), and a third trained machine learning model may have been trained using a second subset of the features (e.g., X1, X3, X4, and X5) that may partially overlap the first subset of features. Data set generator 172 may receive the output of a trained model (e.g., 190), collect that data into training, validation, and testing data sets, and use the data sets to train a second model. Some or all of the operations of server machine 180 may be used to train various types of models, including physics-based models, supervised machine learning models, unsupervised machine learning models, etc.

Validation engine 184 may be capable of validating a trained model 190 using a corresponding set of features of the validation set from data set generator 172. For example, a first trained model 190 that was trained using a first set of features of the training set may be validated using the first set of features of the validation set. The validation engine 184 may determine an accuracy of each of the trained models 190 based on the corresponding sets of features of the validation set. The validation engine 184 may discard trained models 190 that have an accuracy that does not meet a threshold accuracy. In some embodiments, the selection engine 185 may be capable of selecting one or more trained models 190 that have an accuracy that meets a threshold accuracy. In some embodiments, the selection engine 185 may be capable of selecting the trained model 190 that has the highest accuracy of the trained models 190.

Testing engine 186 may be capable of testing a trained model 190 using a corresponding set of features of a testing set from data set generator 172. For example, a first trained model 190 that was trained using a first set of features of the training set may be tested using the first set of features of the testing set. The testing engine 186 may determine a trained model 190 that has the highest accuracy of all of the trained models based on the testing sets.

Model 190 may refer to a physics-based digital twin model of manufacturing equipment, e.g., a semiconductor processing chamber. The physics-based model is configured to solve equations describing the flow of heat, energy, gas, etc., in and around the manufacturing equipment. Measurements performed to characterize components of manufacturing equipment 124 may inform parameters of the physics-based model. The physics-based model may be refined by further training, e.g., measuring steady-state conditions in a processing chamber with various processing parameters applied, and supplying the data to the physics-based model to further refine operations of the physics-based model.

Model 190 may refer to a machine learning model, which may be the model artifact that is created by the training engine 182 using a training set that includes data inputs and corresponding target outputs (correct answers for respective training inputs). Patterns in the data sets can be found that map the data input to the target output (the correct answer), and the machine learning model 190 is provided mappings that captures these patterns. In some embodiments, machine learning model 190 may predict properties of substrates. In some embodiments, machine learning model 190 may predict failure modes of manufacturing chamber components. In some embodiments, machine learning model 190 may predict quality parameters of chamber components.

Predictive component 114 may provide input data to a trained machine learning model 190 and may run the trained machine learning model 190 on the input to obtain one or more outputs. Predictive component 114 may be capable of determining (e.g., extracting) predictive data 168 from the output of the trained machine learning model 190 and may determine (e.g., extract) confidence data from the output that indicates a level of confidence that the predictive data 168 is an accurate predictor of a process associated with the input data for products produced or to be produced, or an accurate predictor of components of manufacturing equipment 124. Predictive component 114 may be capable of determining predictive data 168, including predictions on finished substrate properties and predictions of effective lifetimes of components of manufacturing equipment 124, sensors 126, or metrology equipment 128 based on the output of model 190. Predictive component 114 or corrective action component 122 may use the confidence data to decide whether to cause a corrective action associated with the manufacturing equipment 124 based on predictive data 168.

The confidence data may include or indicate a level of confidence. As an example, predictive data 168 may indicate the properties of a finished wafer given a set of manufacturing inputs, including the use of one or more components described by part quality data 146. The confidence data may indicate that the predictive data 168 is an accurate prediction for products associated with at least a portion of the input data. In one example, the level of confidence is a real number between 0 and 1 inclusive, where 0 indicates no confidence that the predictive data 168 is an accurate prediction for products processed according to input data and 1 indicates absolute confidence that the predictive data 168 accurately predicts properties of products processed according to input data. Responsive to the confidence data indicating a level of confidence below a threshold level for a predetermined number of instances (e.g., percentage of instances, frequency of instances, total number of instances, etc.) the predictive component 116 may cause model(s) 190 to be re-trained (e.g., based on current sensor data 142, current manufacturing parameters 150, etc.).

For purpose of illustration, rather than limitation, aspects of the disclosure describe the training of one or more models 190 using historical data and inputting current data into the one or more trained models 190 to determine predictive data 168. In other implementations, a heuristic model or rule-based model is used to determine predictive data (e.g., without using a trained machine learning model). Predictive component 114 may monitor historical data and metrology data 160. Any of the information described with respect to data inputs 210 of FIG. 2 may be monitored or otherwise used in the heuristic or rule-based model.

In some embodiments, the functions of client device 120, predictive server 112, server machine 170, and server machine 180 may be provided by a fewer number of machines. For example, in some embodiments server machines 170 and 180 may be integrated into a single machine, while in some other embodiments, server machine 170, server machine 180, and predictive server 112 may be integrated into a single machine. In some embodiments, client device 120 and predictive server 112 may be integrated into a single machine.

In general, functions described in one embodiment as being performed by client device 120, predictive server 112, server machine 170, and server machine 180 can also be performed on predictive server 112 in other embodiments, if appropriate. In addition, the functionality attributed to a particular component can be performed by different or multiple components operating together. For example, in some embodiments, predictive server 112 may determine the corrective action based on the predictive data 168. In another example, client device 120 may determine the predictive data 168 based on output from the trained machine learning model or the physics-based (e.g., digital twin) model.

In addition, the functions of a particular component can be performed by different or multiple components operating together. One or more of predictive server 112, server machine 170, or server machine 180 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Embodiments of the disclosure may be applied to data quality evaluation, feature enhancement, model evaluation, Virtual Metrology (VM), Predictive Maintenance (PdM), limit optimization, or the like.

Although embodiments of the disclosure are discussed in terms of generating predictive data 168 to perform a corrective action in manufacturing facilities (e.g., semiconductor manufacturing facilities), embodiments may also be generally applied to improved data processing by utilizing physics-informed digital twin models and sensors to characterize impact of component quality parameters on processing equipment performance.

Figure 2A:
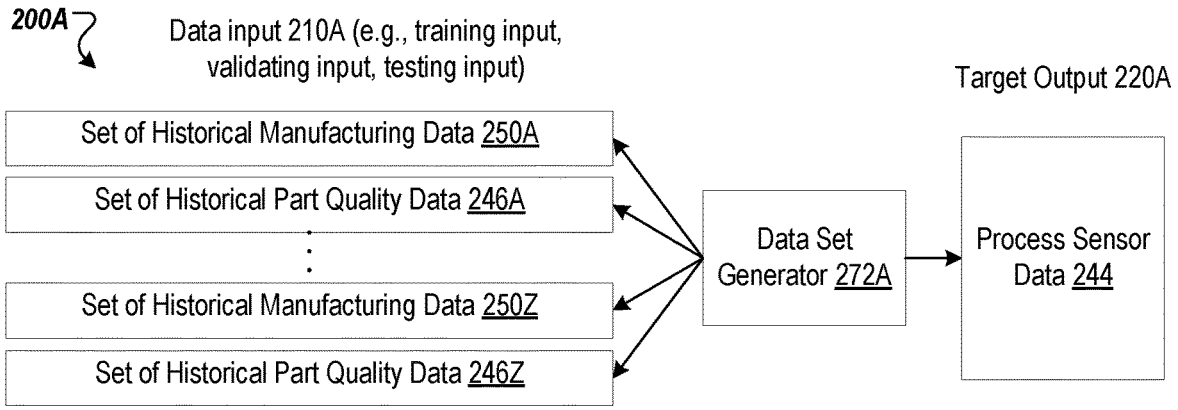
FIGS. 2A-B are block diagrams of example data set generators used to create data sets for a model, according to some embodiments.
Figure 2B:
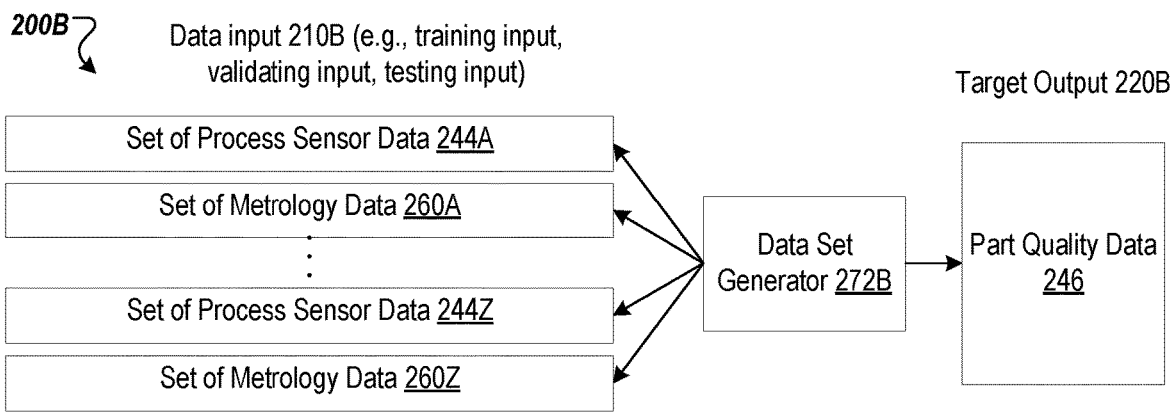

FIGS. 2A-B are block diagrams of example data set generators 272 (e.g., data set generator 172 of FIG. 1), used to create data sets for a model (e.g., model 190 of FIG. 1), according to some embodiments. A data set generator 272 may be part of server machine 170 of FIG. 1. In some embodiments, system 100 of FIG. 1 includes multiple models. In such cases, each model may have a separate data set generator, or models may share a data set generator. Depicted in FIG. 2A is a data set generator associated with a physics-based model (e.g., a digital twin model) configured to take as input manufacturing data (e.g., process set points, hardware parameters, etc.) and part quality data (e.g., data describing measurements of parameters of one or more components of manufacturing equipment) and provide as output predictions of conditions associated with performing a manufacturing or processing procedure using the manufacturing equipment (e.g., measured sensor data of conditions during processing).

System 200A of FIG. 2A contains data set generator 272A (e.g., data set generator 172 of FIG. 1). Data set generator 272A creates data sets for a physics-based model (e.g., model 190 of FIG. 1). Data set generator 272A may create data sets using data retrieved from sensors associated with processing or manufacturing equipment (e.g., part quality data), data retrieved from a data store, data received from a device acting as a controller for the processing equipment, etc. In some embodiments, data set generator 272A creates training input (e.g., data input 210A) from data associated with generating processing conditions for production of substrates, e.g., processing parameter set points, part quality data associated with components of processing equipment, etc. Data set generator 272A also generates target output 220A for training a physics-based model. Target output 220A includes process sensor data 244. Target output includes sensor data collected from sensors monitoring conditions proximate to a work piece processed by manufacturing equipment. Training input data 210A and target output data 220A may be provided to a physics-based model. The physics-based model may use the training input and target output to make adjustments to parameters, coefficients, etc., to accurately predict conditions associated with a manufacturing process (e.g., predict conditions within a manufacturing chamber).

It is within the scope of this disclosure for training inputs, target outputs, model outputs, etc., to be represented in a variety of ways. Maps of component properties, vectors of coefficients, functions recreating physical properties, dimensionally reduced, remapped, or otherwise pre-processed versions of the data, etc.

Referring to FIG. 2B, system 200B including data set generator 272B creates data sets for a machine learning model. The present disclosure enables several distinct uses of machine learning. System 200B depicts a data set generator used in training a machine learning model to predict part quality data of a component installed in manufacturing equipment. Other machine learning models may include data set generation with similar features. Other machine learning models that may be using in connection with the current disclosure include a machine learning model used to predict performance of manufacturing equipment including one or more components with associated quality data, a machine learning model used to predict properties of products produced by manufacturing equipment, a machine learning model used to predict if an unmonitored quality parameter is having a significant effect on product processing, etc.

Data set generator 272B produces data for training a machine learning model. In some embodiments, data set generator 272B creates training input 210B from sensor data of sensor associated with manufacturing equipment (e.g., sensors monitoring conditions in a processing chamber), and performance data (e.g., metrology data of finished products). Data set generator 272B also produces target output data 220B. Target output 220B may include part quality data 246. In some embodiments, target output data 220B includes data associated with part quality of one or more components associated with manufacturing equipment. Training input data 210B and target output data 220B are supplied to train a machine learning model.

In some embodiments, data set generators 272 generate data sets (e.g., training set, validating set, testing set) that includes one or more data inputs 210 (e.g., training input, validating input, testing input) and may include one or more target outputs 220 that correspond to the data inputs 210. The data set may also include mapping data that maps the data inputs 210 to the target outputs 220. Data inputs 210 may also be referred to as "features," "attributes," or "information." In some embodiments, data set generators 272 may provide the data set to the training engine 182, validating engine 184, or testing engine 186 of FIG. 1, where the data set is used to train, validate, or test model 190 (e.g., a physics-based model, a machine learning model, etc.) of FIG. 1. Some embodiments of generating a training set may further be described with respect to FIG. 4A.

In some embodiments, data set generators 272 may generate a first data input corresponding to a first set of input data (e.g., a first set of historical manufacturing data 250A, a first set of historical part quality data 246A, a first set of process sensor data 244A, a first set of metrology data 260A, etc.) to train, validate, or test a first machine learning model. Data set generators 272 may generate a second data input corresponding to a second set of input data (e.g., a second set of historical manufacturing data 250Z, a second set of historical part quality data 246Z, a second set of process sensor data 244Z, a second set of metrology data 260Z, etc.) to train, validate, or test a second machine learning model. Data set generators 272 may also produce corresponding sets of target output data 220.

In some embodiments, data set generators 272 may perform operations on one or more of data inputs 210 and target outputs 220. Data set generators 272 may extract patterns from the data (slope, curvature, etc.), may combine data (average, feature production, etc.), or may separate data into groups (e.g., train a model on a subset of the predicted performance data) and use the groups to train separate models.

Data inputs 210 and target outputs 220 to train, validate, or test a machine learning model may include information for a particular component of manufacturing equipment (e.g., a particular substrate chuck assembly). Data inputs 210 and target outputs 220 may include information for a particular component design (e.g., used for all components of that design). Data inputs 210 and target outputs 220 may include information for a particular component role (e.g., used for all component designs that fulfill the same role in processing). Data inputs 210 and target outputs 220 may include information for a particular type of processing, target product design, target product property, or may be grouped together in another way.

In some embodiments, data set generators 272 may generate sets of target output 220. Target outputs 220 may be separated into sets corresponding to sets of input data. Different sets of target output 220 may be used in connection with the similarly defined sets of data input 210, including training different models, using different sets for training, validating, and testing, etc.

Target outputs 220 may be generated by correlating trends in performance data to appropriate corrective actions using a method other than machine learning. A user may indicate that performing a particular corrective action addressed a difference between historical predicted performance and measured performance, a manufacturing fault may be intentionally introduced to generate data useful for training, etc. In some embodiments, a model may be trained without target output 220 (e.g., an unsupervised or semi-supervised model). A model trained that is not provided with target output may, for example, be trained to recognize significant (e.g., outside an error threshold) differences between predicted and measured performance data.

In some embodiments, the information used to train the machine learning model may be from specific types of manufacturing equipment (e.g., manufacturing equipment 124 of FIG. 1) of the manufacturing facility having specific characteristics and allow the trained machine learning model to determine outcomes for a specific group of manufacturing equipment 124 based on input of predicted performance data and measured performance data associated with one or more components sharing characteristics of the specific group. In some embodiments, the information used to train the machine learning model may be for components from two or more manufacturing facilities and may allow the trained machine learning model to determine outcomes for components based on input from one manufacturing facility.

In some embodiments, subsequent to generating a data set and training, validating, or testing a machine learning model using the data set, the machine learning model may be further trained, validated, or tested, or adjusted.

Figure 3:
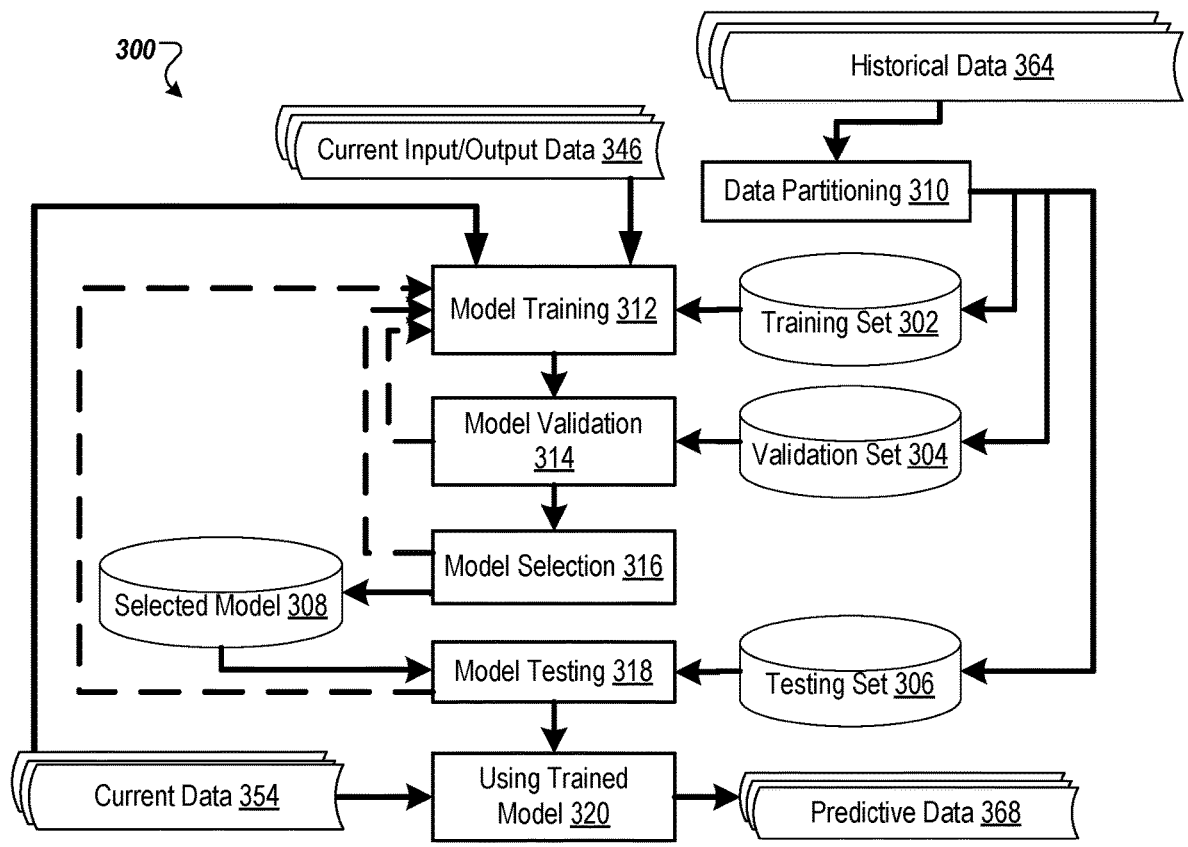
FIG. 3 is a block diagram illustrating system for generating output data (e.g., predictive data 168 of FIG. 1), according to some embodiments

FIG. 3 is a block diagram illustrating system 300 for generating output data (e.g., predictive data 168 of FIG. 1), according to some embodiments. System 300 may be used to analyze processing parameters, sensor data, and metrology data, and provide predictive data indicative of a corrective action in view of the data. For example, system 300 may indicate that one or more components of manufacturing equipment are failing or drifting, are of worsening quality than expected, etc. A system similar to system 300 may be used for other models, such as a machine learning model that predicts chamber performance, a machine learning model that predicts substrate metrology, a machine learning model that predicts that an unmonitored quality parameter is contributing significantly to conditions in a chamber, etc. Some or all of the operations of system 300 may be used to generate data indicative of characterization of one or more manufacturing equipment components via a physics-based digital twin model. In these cases, other data than that pictured in FIG. 3 may be used as input and produced as output by system 300, as appropriate.

Referring to FIG. 3, at block 310, the system 300 (e.g., components of predictive system 110 of FIG. 1) performs data partitioning (e.g., via data set generator 172 of server machine 170 of FIG. 1) of historical data 364 (e.g., historical process sensor data, historical metrology data, and historical part quality data, historical performance data) to generate training set 302, validation set 304, and testing set 306. For example, the training set may be 60% of the performance data, the validation set may be 20% of the performance data, and the testing set may be 20% of the performance data.

At block 312, the system 300A performs model training (e.g., via training engine 182 of FIG. 1) using the training set 302. The system 300 may train one model or may train multiple models using multiple sets of features of the training set 302 (e.g., a first set of features including a subset of performance data of the training set 302, a second set of features including a different subset of performance data of the training set 302, etc.). For example, system 300 may train a machine learning model to generate a first trained machine learning model using the first set of features in the training set and to generate a second trained machine learning model using the second set of features in the training set (e.g., different data than the data used to train the first machine learning model). In some embodiments, the first trained machine learning model and the second trained machine learning model may be combined to generate a third trained machine learning model (e.g., which may be a better predictor than the first or the second trained machine learning model on its own). In some embodiments, sets of features used in comparing models may overlap (e.g., one model may be trained with performance data indicative of film thickness, and another model with performance data indicative of both film thickness and film stress, different models may be trained with data from different locations of a substrate, different models may be trained with data from different overlapping sets of sensors, etc.). In some embodiments, hundreds of models may be generated including models with various permutations of features and combinations of models.

At block 314, the system 300 performs model validation (e.g., via validation engine 184 of FIG. 1) using validation set 304. System 300 may validate each of the trained models using a corresponding set of features of the validation set 304. For instance, validation set 304 may use the same subset of performance data used in training set 302, but for different input conditions. In some embodiments, system 300A may validate hundreds of models (e.g., models with various permutations of features, combinations of models, etc.) generated at block 312. At block 314, system 300 may determine an accuracy of each of the one or more trained models (e.g., via model validation) and may determine whether one or more of the trained models has an accuracy that meets a threshold accuracy. Responsive to determining that none of the trained models has an accuracy that meets a threshold accuracy, flow returns to block 312 where system 300 performs model training using different sets of features of the training set. Responsive to determining that one or more of the trained models has an accuracy that meets a threshold accuracy, flow continues to block 316. System 300 may discard the trained machine learning models that have an accuracy that is below the threshold accuracy (e.g., based on the validation set).

At block 316, system 300 may perform model selection (e.g., via selection engine 185 of FIG. 1) to determine which of the one or more trained models that meet the threshold accuracy has the highest accuracy (e.g., selected model 308, based on the validating of block 314). If only a single model was trained (or in another applicable condition, such as all models trained are to be used as an ensemble model, etc.), then the operations of block 316 may be skipped. Responsive to determining that two or more of the trained models that meet the threshold accuracy have the same accuracy, flow may return to block 312 where the system 300 performs model training using further refined training sets corresponding to further refined sets of features for determining a trained model that has the highest accuracy.

At block 318 system 300 performs model testing (e.g., via testing engine 186 of FIG. 1) using the testing set 306 to test the selected model 308. The system 300 may test, using the first set of features in the testing set, the first trained machine learning model to determine the first trained machine learning model meets a threshold accuracy (e.g., based on the first set of features of the testing set 306). Responsive to accuracy of the selected model 308 not meeting the threshold accuracy (e.g., the selected model 308 is overly fit to training set 302 and/or validation set 304 and is not applicable to other data sets such as the testing set 306), flow continues to block 312 where system 300 performs model training (e.g., retraining) using different training sets possibly corresponding to different sets of features or a reorganization of substrates split into training, validation, and testing sets. Responsive to determining that the selected model 308 has an accuracy that meets a threshold accuracy based on the testing set 306, flow continues to block 320. In at least block 312, the model may learn patterns in the simulated sensor data to make predictions and in block 318, system 300 may apply the model on the remaining data (e.g., testing set 306) to test the predictions.

At block 320, system 300 uses the trained model (e.g., selected model 308) to receive current data 354 (e.g., process sensor data, current manufacturing parameter data, current product performance data, etc.) and determines (e.g., extracts), from the output of the trained model, predictive data 368 (e.g., predictive data 168 of FIG. 1) to perform an action (e.g., perform a corrective action in association with manufacturing equipment 124 of FIG. 1, provide an alert to client device 120 of FIG. 1, etc.).

In some embodiments, retraining of the machine learning model occurs by supplying additional data to further train the model. Current data 354 (e.g., model input and output data) may be provided at block 312. Current input/output data 346 may include the same types of data as originally used to train the machine learning model, e.g., input including sensor data and manufacturing parameters, target output including part quality data, etc. These data may be different from the data originally used to train the model by incorporating combinations of input parameters not part of the original training, input parameters outside the parameter space spanned by the original training, or may be updated to reflect chamber specific knowledge (e.g., differences from an ideal chamber due to manufacturing tolerance ranges, aging components, etc.). Selected model 308 may be retrained based on this data.

In some embodiments, one or more of the acts 310-320 may occur in various orders and/or with other acts not presented and described herein. In some embodiments, one or more of acts 310-320 may not be performed. For example, in some embodiments, one or more of data partitioning of block 310, model validation of block 314, model selection of block 316, or model testing of block 318 may not be performed. In training a physics-based digital twin model, e.g., to take as input measurements of part quality parameters of a component and produce as output predicted performance data of a chamber including the component, a subset of these operations may be performed. In cases where a machine learning model is to be trained using different data, e.g., trained to make predictions based on different input data, trained to make predictions other than part quality predictions, such as predictions of substrate metrology or conditions in a manufacturing chamber, etc., the training data, input data, output data, and retraining data may be changed as appropriate.

FIGS. 4A-E are flow diagrams of methods 400A-E associated with characterizing one or more components of manufacturing equipment to cause a corrective action, according to certain embodiments. Methods 400A-E may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, methods 400A-E may be performed, in part, by predictive system 110. Method 400A may be performed, in part, by predictive system 110 (e.g., server machine 170 and data set generator 172 of FIG. 1, data set generators 272 of FIG. 2). Predictive system 110 may use method 400A to generate a data set to at least one of train, validate, or test a model, in accordance with embodiments of the disclosure. The model may be a physics-based digital twin model (e.g., to generate predictive performance data of manufacturing equipment including components with known values of one or more quality parameters), a machine learning model (e.g., to generate predictive performance data of a wafer, to generate data indicative of a corrective action associated with a component of manufacturing equipment, etc.), a statistical model, or another model trained to receive input and generate output related to component quality. Methods 400B-E may be performed by predictive server 112, client device 120, etc. In some embodiments, a non-transitory storage medium stores instructions that when executed by a processing device (e.g., of predictive system 110, of server machine 180, of predictive server 112, etc.) cause the processing device to perform one or more of methods 400A-E.

For simplicity of explanation, methods 400A-E are depicted and described as a series of operations. However, operations in accordance with this disclosure can occur in various orders and/or concurrently and with other operations not presented and described herein. Furthermore, not all illustrated operations may be performed to implement methods 400A-E in accordance with the disclosed subject matter. In addition, those skilled in the art will understand and appreciate that methods 400A-E could alternatively be represented as a series of interrelated states via a state diagram or events.

Figure 4A:
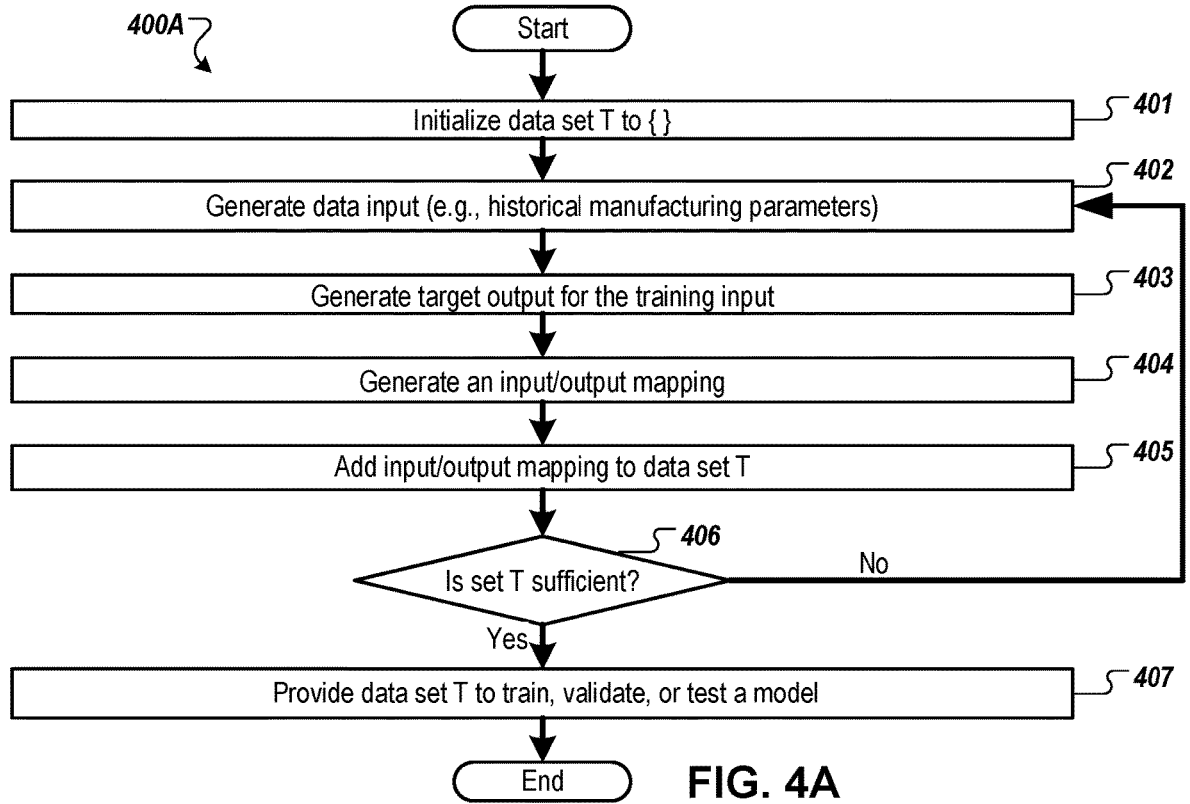
FIGS. 4A-E are flow diagrams of methods associated with characterizing one or more components of manufacturing equipment to cause a corrective action, according to certain embodiments

FIG. 4A is a flow diagram of a method 400A for generating a data set for a model for generating predictive data (e.g., predictive data 168 of FIG. 1), according to certain embodiments. The model may be a machine learning model, a physics-based model, a digital twin model, etc.

Referring to FIG. 4A, in some embodiments, at block 401 the processing logic implementing method 400A initializes a training set T to an empty set.

At block 402, processing logic generates first data input (e.g., first training input, first validating input) that may include sensor data, metrology data (e.g., film properties such as thickness, material composition, optical properties, roughness, and so on), processing parameter data, part quality data, etc. In some embodiments, the first data input may include a first set of features for types of data and a second data input may include a second set of features for types of data (e.g., as described with respect to FIG. 3).

For example, method 400A may be used to generate data sets for a machine learning model configured to accept as input target processing parameters (e.g., processing set points) and measured performance data (e.g., sensor data, metrology data, etc.) and produce as output predictions of values of one or more quality parameters of one or more components of the manufacturing equipment. At block 402, training input comprising sensor data, combinations of sensor data, features of sensor data, etc., may be generated.

At block 403, processing logic generates a first target output for one or more of the data inputs (e.g., first data input). In some embodiments, the first target output is part quality data. In some embodiments, the first target output is indicative of manufacturing equipment performance. In some embodiments, the first target output is data indicative of a corrective action. In some embodiments, no target output is generated (e.g., for training an unsupervised machine learning model).

For example, method 400A may be used to generate data sets for a machine learning model configured to accept as input target processing parameters and measured performance data, and produce as output predictions of values of one or more quality parameters of one or more components of the manufacturing equipment. The machine learning model may further be configured to identify potentially problematic quality parameter values, e.g., components which, when replaced, serviced, maintained, etc., may improve processing conditions of the manufacturing equipment. Data indicative of corrective actions (such as adjusting a maintenance schedule, replacing a component, updating a process recipe, etc.) may be used to generate target output for training (validating, testing, etc.) a machine learning model.

At block 404, processing logic optionally generates mapping data that is indicative of an input/output mapping. The input/output mapping (or mapping data) may refer to the data input (e.g., one or more of the data inputs described herein), the target output for the data input, and an association between the data input(s) and the target output. In some embodiments (e.g., those without target output data) these operations may not be performed.

At block 405, processing logic adds the mapping data generated at block 404 to data set T, in some embodiments.

At block 406, processing logic branches based on whether data set T is sufficient for at least one of training, validating, and/or testing a model, e.g., model 190 of FIG. 1. If so, execution proceeds to block 407, otherwise, execution continues back at block 402. It should be noted that in some embodiments, the sufficiency of data set T may be determined based simply on the number of inputs, mapped in some embodiments to outputs, in the data set, while in some other implementations, the sufficiency of data set T may be determined based on one or more other criteria (e.g., a measure of diversity of the data examples, accuracy, etc.) in addition to, or instead of, the number of inputs.

At block 407, processing logic provides data set T (e.g., to server machine 180 of FIG. 1) to train, validate, and/or test a model, e.g., model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing.

Figure 4B:
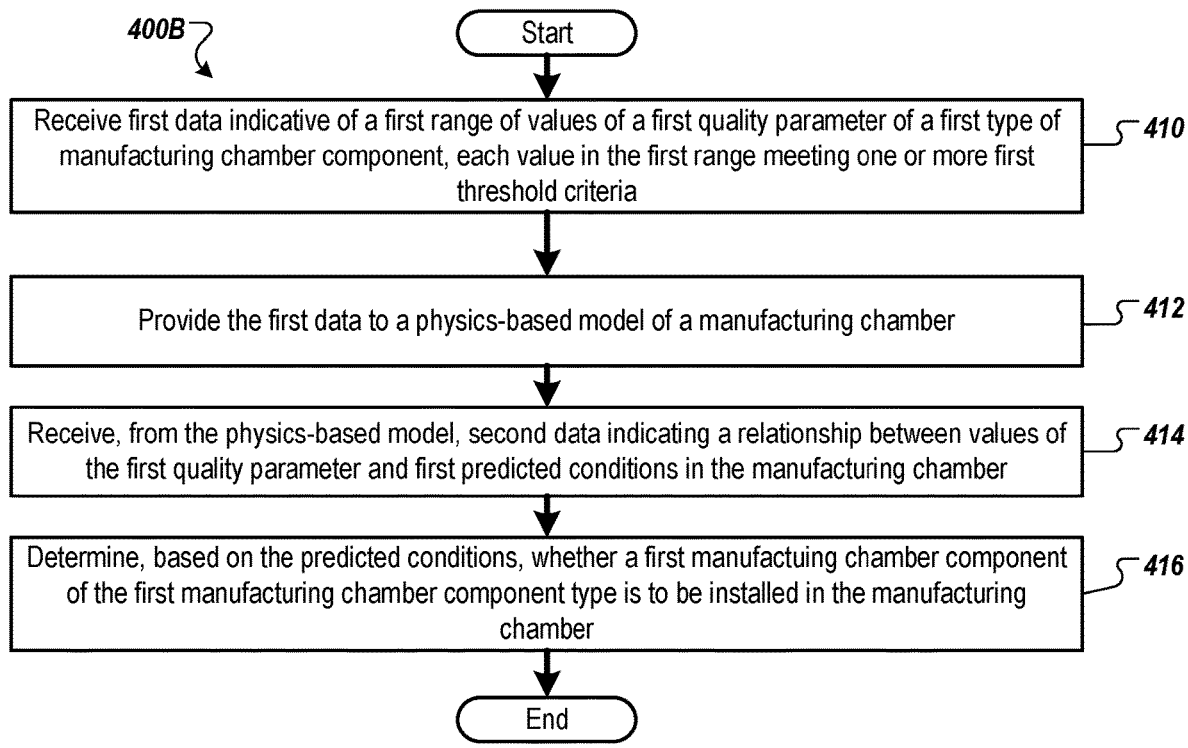

FIG. 4B is a method 400B for determining if a component is suitable for installation in a manufacturing chamber, according to some embodiments. Logic analogous to that of method 400B may be used to determine if a component is suitable for installation in other types of processing equipment as well. At block 410 of method 400B, processing logic receives data indicative of a range of values of a quality parameter of a type of manufacturing chamber component. The type of component may be any part included in manufacturing equipment. For example, the type of component may be a part of a particular design (e.g., a part number), a part that performs a certain function (e.g., a showerhead, gas manifold, pumping plate, substrate support, etc.), a part or group of parts associated with a process, or the like. The quality parameter may be any parameter of the component. Physical dimensions of the component (or one or more portions of the component, such as depth of electrodes beneath the surface of a substrate support), material properties of the component (emissivity, density, etc.), chemical properties of the component (e.g., composition), electrical properties, optical properties, etc., may be measured as quality parameters and provided to a physics-based model. The quality parameter may be a parameter expected to have an impact on the performance of the component, e.g., expected to impact conditions proximate to a substrate in a substrate processing chamber. In some embodiments, multiple quality parameter values may be measured and utilized as part of method 400B and other methods of this disclosure. In some embodiments, the range of values corresponds to measured values of a number of different components of the same component type. In some embodiments, the range of values may correspond to an expected range of the quality parameter exhibited by a set of components. In some embodiments, each value in the range meets one or more threshold criteria and is considered to be within specification. The criteria may be associated with manufacturing tolerances for the component. The range of values may be associated with the threshold criteria and/or manufacturing tolerances for the component.

At block 412, processing logic provides the data indicative of the range of values to a physics-based model of manufacturing equipment, such as a manufacturing chamber. The physics-based model may be or include a digital twin model. The physics-based model may be configured to solve equations describing heat transfer, energy balance, gas flow, etc., associated with the manufacturing equipment. The physics-based model may be configured to produce as output data indicative of conditions proximate to a work piece, such as a semiconductor wafer, to be processed using the manufacturing equipment.

At block 414, processing logic receives, from the physics-based model, data indicating a relationship between values of the quality parameters and predicted conditions in the manufacturing chamber. In some embodiments, the relationship may be a relationship between conditions achievable using a component with various values of one or more quality parameters. In some embodiments, the relationship may be a likelihood of achieving some target conditions. In some embodiments, the relationship may be an indication of what input parameters would produce a target condition using a component with an input quality parameter value.

At block 416 a determination is made, based on the relationship between the quality parameter and predicted conditions, whether a manufacturing chamber component of the manufacturing component type is to be installed in the manufacturing equipment.

In some embodiments, one or more quality parameters of the chamber component corresponding to the parameter associated with the range of values provided to the physics-based model is measured. The output of the physics-based model may indicate that a chamber component may not be well suited to installation in a chamber. The value of the quality parameter of the component may be such that target conditions in the chamber would not be achieved. The value of the quality parameter of the component may be such that target conditions in the chamber would not be achieved with a target consistency (e.g., a fraction of attempts above a target threshold). The value of the quality parameter of the component may be such that target conditions in the chamber would be achievable by altering processing parameters in an undesirable way, e.g., using more energy, more gas, more material, with more processing time, etc. In some embodiments, processing logic may receive data indicative of target conditions for a manufacturing process. A determination may be made on whether the chamber component is well-suited to use for that manufacturing process, based on the relationship between one or more quality parameters of the component and predicted conditions proximate to the work piece of manufacturing equipment.

In some embodiments, multiple quality parameters of a single part type may be measured, ranges of multiple quality parameters may be provided to the physics-based model, the multiple quality parameters may be used as a basis for component installation selection, etc. In some embodiments, quality parameter values of a chamber component that may be installed in a chamber are provided to the physics-based model. In some embodiments, the quality parameter values of the component are compared to pre-generated output by the physics-based model, e.g., a table or function describing the relationship between quality parameter values and chamber conditions.

Figure 4C:
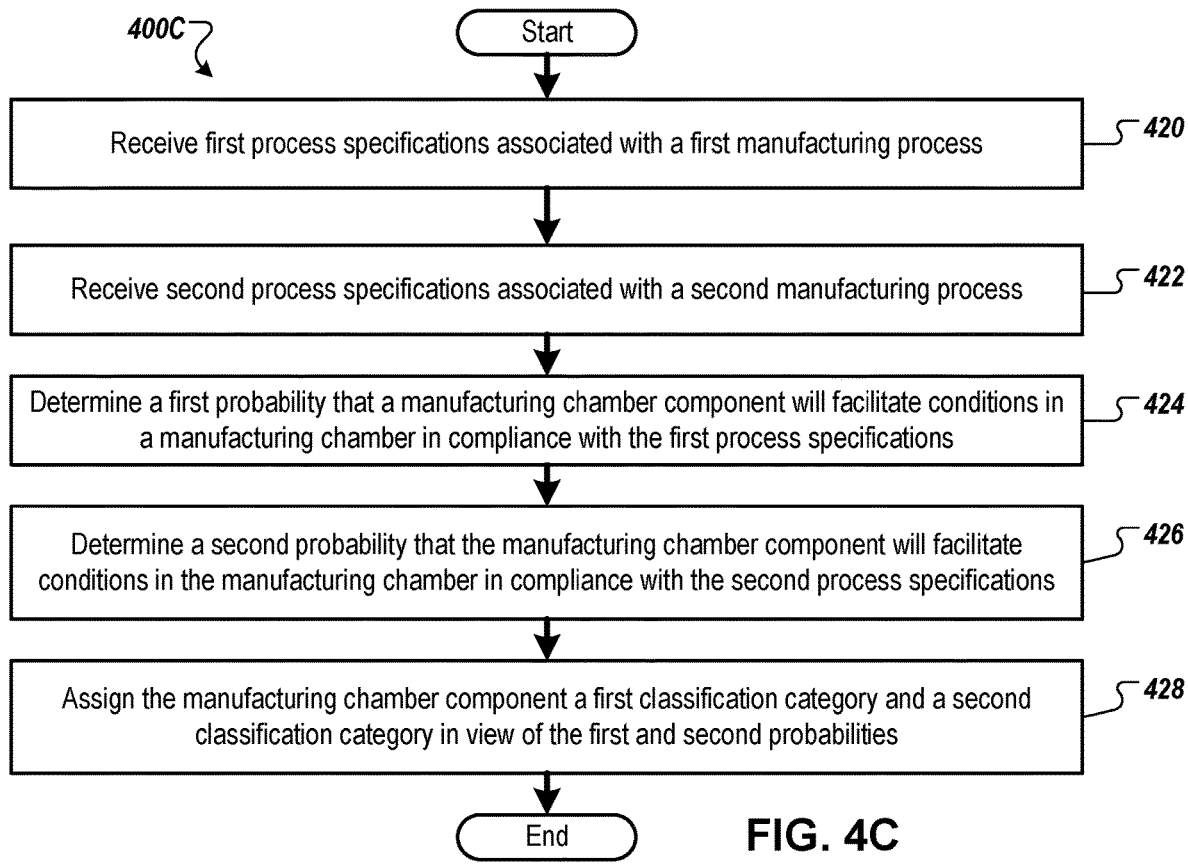

FIG. 4C depicts a flow diagram of method 400C of utilizing part quality data in component classification, according to some embodiments. At block 420, processing logic receives first process specifications associated with a first manufacturing process. In some embodiments, the first manufacturing process is a semiconductor wafer manufacturing process. In some embodiments, process specifications include target conditions proximate to a substrate for processing. At block 422, processing logic receives second process specifications associated with a second manufacturing process. The second process is different than the first. At least one of the second process specifications is different than the first. Second process specifications may share many features with first process specifications.

At block 424, processing logic determines a first probability that a manufacturing chamber component will facilitate conditions in a manufacturing chamber that are in compliance with the first process specifications. In some embodiments, determining the probability may include providing process specifications to a physics-based model. In some embodiments, determining the probability may include providing part quality data of the component to a physics-based model. In some embodiments, the probability may be based on a set of processing parameter inputs (e.g., ideal processing parameters, efficient processing parameters, processing parameters above a threshold of efficiency, etc.). At block 426, processing logic determines a second probability that the component will facilitate conditions in the manufacturing chamber in compliance with the second process specifications. In some embodiments, the chamber associated with the first process specifications and the chamber associated with the second process specifications may be the same chamber. In some embodiments, they may be two different chambers. In some embodiments, they may be two chambers of the same design. In some embodiments they may be of different design. In some embodiments, a second physics-based model is used to simulate operations associated with the second process specifications. Operations of block 426 may share many features with operations of block 424.

At block 428, processing logic assigns the component a first classification category and a second classification category, in view of the first and second probabilities, respectively. In some embodiments, components with a probability of achieving target processing conditions above a threshold are categorized in a first category, and components below the threshold categorized in a second category. In some embodiments, more granular categorization may be utilized (e.g., a component between 90 and 100% likely to achieve target processing specifications may be categorized in a first category for that process, a component between 80 and 90% likely to achieve target processing specifications may be categorized in a second category for that process, etc.). A component may receive different classifications for different sets of process specifications. In some embodiments, components are binned into categories based on the processes they are well suited (e.g., exhibit appropriate quality parameters) to perform. Thresholds, limits, binning categories, etc., may be tuned as appropriate to a particular process, component type, target product, target manufacturing facility, etc.

In some embodiments, multiple component types may be categorized (e.g., binned) based on their performance in view of a set of process specifications. In some embodiments, components of one type may be categorized (e.g., binned) based on their performance in view of more than one set of process specifications. In some embodiments, a physics-based model of manufacturing equipment includes quality parameters of one or more components installed as part of the manufacturing equipment. In some embodiments, parts may be categorized based on their probability of achieving target process specifications according to a physics-based model including quality parameters of components already installed as part of the manufacturing equipment.

Figure 4D:
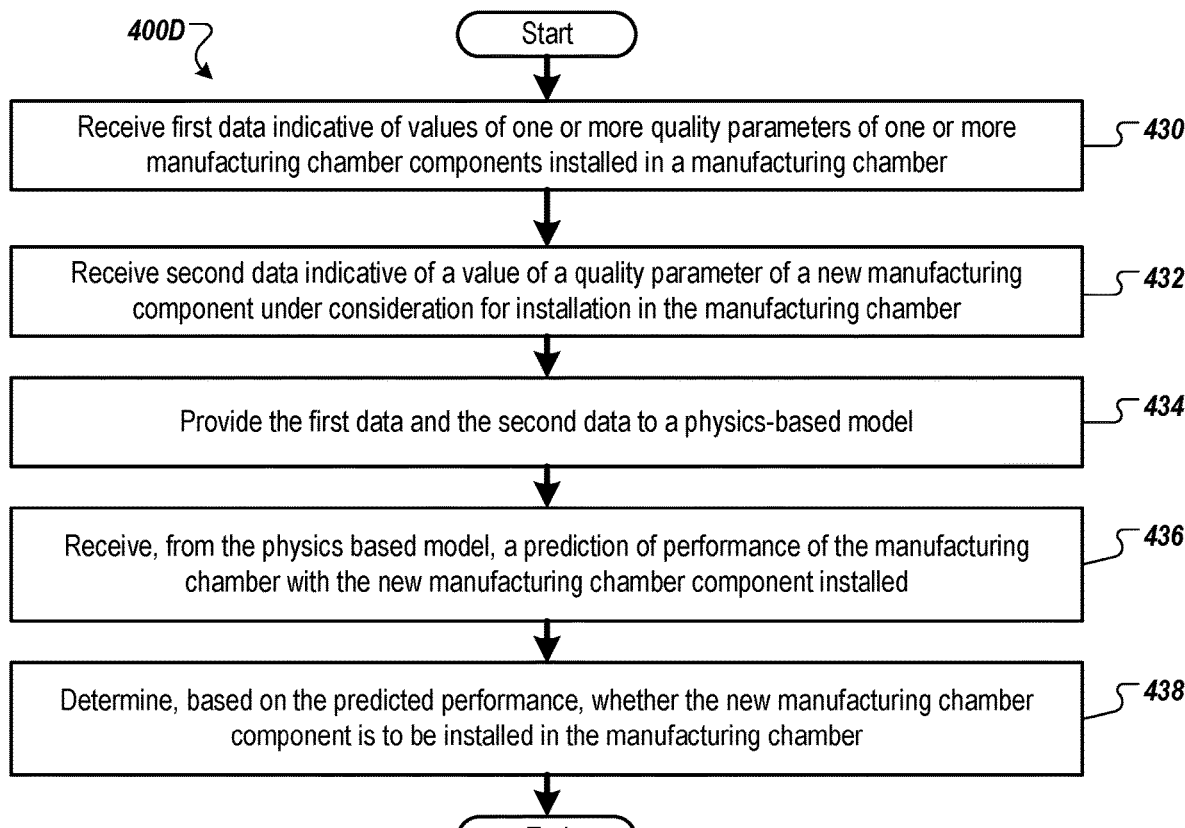

FIG. 4D depicts a flow chart of a method 400D for determining if a component is to be installed in a set of manufacturing equipment with other components installed for which part quality data is available, according to some embodiments. In some embodiments, classification of parts may be performed using a physics-based model of a standard or generic chamber, e.g., without taking into account part quality data of components already installed in the chamber. Parts may be classified by their suitability for a particular process (e.g., suitable vs. unsuitable, degrees of suitability, scored or ranked, etc.). In some embodiments, a component may be evaluated for suitability for installation as part of a specific set of manufacturing equipment (e.g., in a specific processing chamber).

At block 430, processing logic receives first data indicative of values of one or more quality parameters of one or more manufacturing chamber components installed in a manufacturing chamber. The values of the one or more quality parameters may have been measured before the components were installed in the chamber. The values of the one or more quality parameters may have been used to determine whether the components were to be installed in the chamber. The values of the one or more quality parameters may have been predicted by a machine learning model, e.g. a model taking as input process parameters, sensor data, etc., and providing as output a prediction of one or more quality parameters of one or more chamber components.

At block 432, processing logic receives second data indicative of a value of a quality parameter of a new manufacturing chamber component. The new manufacturing chamber component is under consideration for installation into the manufacturing chamber. The quality parameter data of the new manufacturing chamber component may have been measured previously. The new component may have been chosen for consideration for installation in the chamber based on the value of the quality parameter. In some embodiments, the second data may further include data indicative of the value of a second, third, etc., quality parameter of the new manufacturing chamber component.

At block 434, processing logic provides the first data and the second data to a physics-based model. The physics-based model may include a digital twin model. The physics-based model predicts performance of manufacturing equipment, such as a processing chamber. The physics-based model may be configured to determine solutions to equations that describe conditions in the chamber, such as heat transfer equations, gas flow, energy balance, etc. The physics-based model may be configured for a particular chamber, chamber type, process type, manufacturing facility, etc.

At block 436, processing logic receives, from the physics-based model, a prediction of performance of the manufacturing chamber with the new manufacturing chamber component installed. The physics-based model performs calculations which describe processing conditions. The physics-based model takes into account one or more quality parameters of one or more components installed in the manufacturing equipment, and one or more quality parameters of the new component under consideration for installation. The physics-based model may exclude quality parameter data associated with a part installed in the manufacturing equipment of the same type as the new part (e.g., may virtually replace an old component with the new component). The predicted performance data may include a prediction of conditions achieved in a manufacturing chamber. The performance data may include predictions of resources that will be utilized to reach target conditions in a chamber, e.g., efficiency of the combination of chamber components. The performance data may include predictions of a likelihood of reaching target conditions.

At block 438, processing logic determines, based on the predicted performance, whether the new manufacturing chamber component is to be installed in the manufacturing chamber. The determination is made in view of the output from the physics-based model. In some embodiments, the new component may have been pre-screened for inclusion in the chamber. One or more quality parameters of the component may have been measured, and supplied to a physics-based model, compared to a chart or table of properties, etc. In some embodiments, a component's suitability for installation in a chamber may be initially determined using data associated with a generic chamber. Method 400D may be used to refine a selection process of components to be installed in a manufacturing chamber by taking into account properties of components already installed in the chamber.

In some embodiments, a component that was prescreened and found suitable for installation in a chamber may be found to not be suitable for installation upon providing data indicative of quality of components found in the chamber to a physics-based model. In some embodiments, the new component may be installed in the chamber. In some embodiments, a process recipe may be updated in view of the output of the physics-based model, e.g., to increase the likelihood of reaching target process parameters with the new component installed in the manufacturing chamber.

In some embodiments, the output of a physics-based model may indicate that a chamber with the new component installed (or any chamber with any combination of components) will perform as well as required for an application but perform worse than a higher performance target. For example, the physics-based model may predict that a combination of components may perform well enough to produce target conditions, but with a smaller window for error than other chambers, other combinations of components, or the like. One chamber may be predicted to achieve target parameters, but not predicted to achieve a more stringent set of parameters. Drift or aging may be expected to make such a chamber inoperable in a shorter amount of time than a chamber that is capable of achieving the more stringent set of parameters. A maintenance schedule for the first chamber may be adjusted to enable more frequent maintenance events, and reduce unplanned downtime of the chamber. A schedule of sending products from the first chamber to quality control may be altered, increasing the number of products qualified. A schedule to check the quality of the chamber (e.g., qualification event) may be adjusted.

Figure 4E:
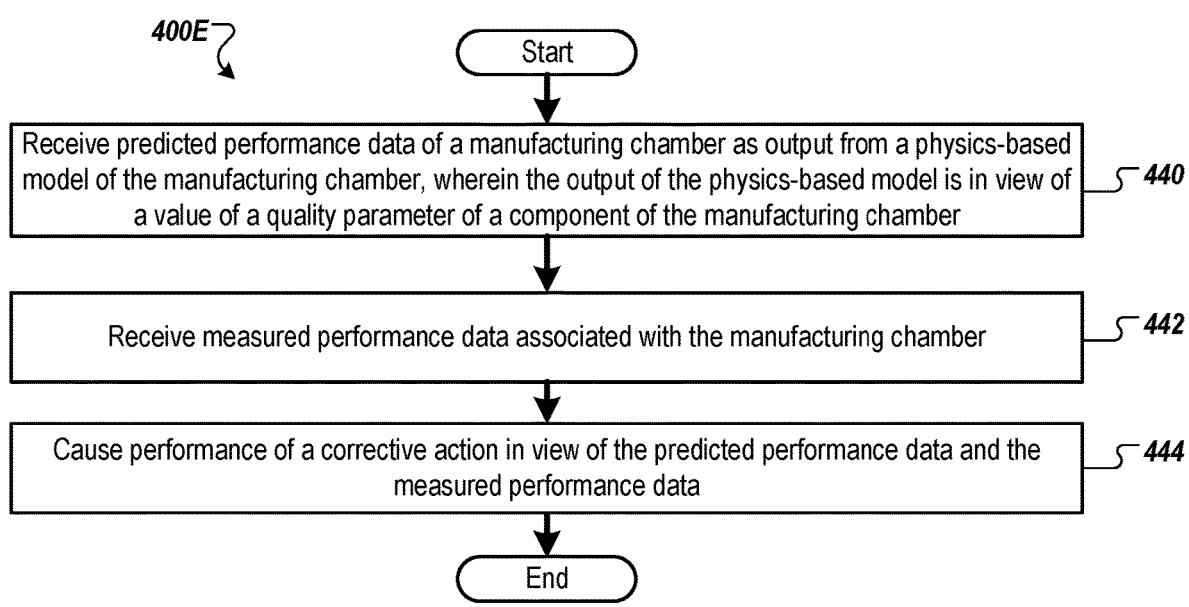

FIG. 4E is a flow diagram of a method for utilizing part quality data for performance of a corrective action, according to some embodiments. At block 440, processing logic receives predicted performance data of a manufacturing chamber from a physics-based model. The physics-based model may be a digital twin of a manufacturing chamber. The physics-based model may have received as input data indicative of a value of a quality parameter of a component of the manufacturing chamber. The output from the physics-based model may have been generated in view of the input. In some embodiments, the physics-based model may have received data indicative of a value of a second quality parameter of the chamber component. In some embodiments, the physics-based model may have received data indicative of a value of one or more quality parameters of a second chamber component. The physics-based model may generate predicted performance data based on values of one or more quality parameters of one or more chamber components installed in the manufacturing chamber. In some embodiments, one or more of the quality parameters may be within a manufacturing specification range for the associated chamber component.

In some embodiments, the first chamber component was pre-screened for installation in the chamber before installation. In some embodiments, the first chamber component may have been selected for installation based on the pre-screening process. The chamber component may have been assigned a classification as a result of the pre-screening process. One or more quality parameters of the chamber component may have been used to assign the classification. One or more target process specifications (e.g., target conditions in a processing chamber) may have been used to assign the classification. The classification may have been assigned based on the output from a physics-based model.

In some embodiments, the first chamber component may have been installed as part of the manufacturing equipment based on the output from a physics-based model of the manufacturing equipment. The physics-based model of the manufacturing equipment may have utilized quality parameter data associated with the first chamber component and quality parameter data associated with one or more chamber components installed in the chamber. The physics-based model may have determined that the first chamber component was suitable for installation in the chamber, based on the quality parameters of the components and target process parameters (e.g., the combination of components including the first component was determined to be capable of achieving target conditions, determined to have an acceptable probability of reaching target conditions, determine to be capable of achieving target conditions while expending an acceptable amount of resources, etc.).

In some embodiments, predicted performance data may include predicted conditions in a processing chamber, such as predictions of temperature, pressure, etc. In some embodiments, predicted performance data may include predictions of resources expended to achieve target conditions. In some embodiments, predicted performance data includes predicted metrology data of manufactured products. In some embodiments, further processing may be performed on the output of the physics-based model. For example, predicted processing conditions as output by the physics-based model (or data indicative of processing conditions) may be provided to another model, which may predict substrate metrology based on the processing conditions. In some embodiments, output of the physics-based model may be supplied to a second physics-based model, a digital twin model, a rule-based model, a machine learning model, etc., to receive further predicted performance data.

At block 442, processing logic receives measured performance data associated with the manufacturing chamber. Measured performance data may be data obtained by sensors (e.g., sensor data 142 of FIG. 1), metrology equipment (e.g., metrology equipment 128), etc. Measured performance data may include many of the same features as predicted performance data associated with block 440. Measured performance data may include description of conditions in a manufacturing chamber, indications of resources expended to obtain the conditions, measurements made on finished products (e.g., substrate thickness, chemical properties, optical properties, etc.), or the like.

At block 444, processing logic causes performance of a corrective action in view of the predicted performance data and the measured performance data. Processing logic may compare predicted performance data to measured performance data. Differences between predicted performance and measured performance may be used in determining a corrective action to be performed. A difference between measured and predicted conditions within the chamber may be used to update a process recipe to achieve target conditions, a difference between measured and predicted resource usage may be used to schedule preventative maintenance of one or more components, a difference between measured and predicted metrology data may be used to schedule replacement of one or more components, etc.

The corrective action performed may be chosen to accomplish one or more of decreasing future differences between measured and predicted data (e.g., differences between future predicted data of a future process and measured data of the process) or improving future measured data (e.g., achieve target performance metrics, achieve target performance metrics while expending fewer resources, etc.). The corrective action may include one or more of providing an alert to a user, updating a process recipe, scheduling preventative or corrective maintenance, updating a preventative maintenance schedule, scheduling replacement of a component, correcting for sensor drift, or updating a physics-based model associated with the manufacturing equipment.

In some embodiments, the corrective action is selected in response to receiving output from a trained machine learning model. The machine learning model may be trained, by providing to the machine learning model training input data and target output data. The machine learning model may be trained to take as input predicted and measured performance data of manufacturing equipment and provide as output data indicative of quality of a chamber component, a suggested corrective action, or the like. In some embodiments, a machine learning model is provided with predicted and measured performance data as input. Additional data may also be provided to the machine learning model, such as data on component drift or aging, maintenance data, chamber history data, etc. In some embodiments, data such as these may be utilized in calculated predicted performance data. The trained machine learning model may be trained (e.g., by providing part quality data of one or more components of the manufacturing chamber as target output) to produce as output an estimate of values of one or more quality parameters of one or more components of manufacturing equipment. In some embodiments, the quality parameter estimates may be used to determine a corrective action, e.g., may indicate that some change in the quality of a part has occurred since the quality parameter was measured.

In some embodiments, a machine learning model may be used to determine if a chamber component is contributing to drift or failure of the chamber. Predicted performance data and measured performance data may be provided to a trained machine learning model as input. The trained machine learning model may provide as output a prediction of what component is responsible for a discrepancy between the predicted and measured performance data (e.g., the model may have been trained using predicted and measured performance data from a chamber with a known faulty component). In some embodiments, discrepancies between predicted performance data and measured performance data may be indicative of a failing or drifting component (e.g., as identified by a machine learning model). In some embodiments, discrepancies between predicted performance data and measured performance data may indicate that a quality parameter of the component that has not been characterized has a measureable effect on conditions in the chamber. Identification of components that have additional critical quality parameters may be used to refine or improve part quality measurement, part classification, physics-based models, digital twin models, etc.

In some embodiments, predicted performance data of manufacturing equipment (e.g., a processing chamber) may be used to determine predicted performance of a finished product (e.g., semiconductor wafer) using a machine learning model. A machine learning model may be trained by providing training input and target output. The training input and target output may include historical data. The training input may include conditions (or predicted conditions) in a processing environment (such as a manufacturing chamber). The target output may include measured metrology data of a product or products produced in the conditions provided as training input. The trained machine learning model may be provided with predicted conditions in a chamber (which may be based on the output of a physics-based model) during a processing operation. The trained machine learning model may then predict metrology data of a product processed in those conditions.

Figure 5:
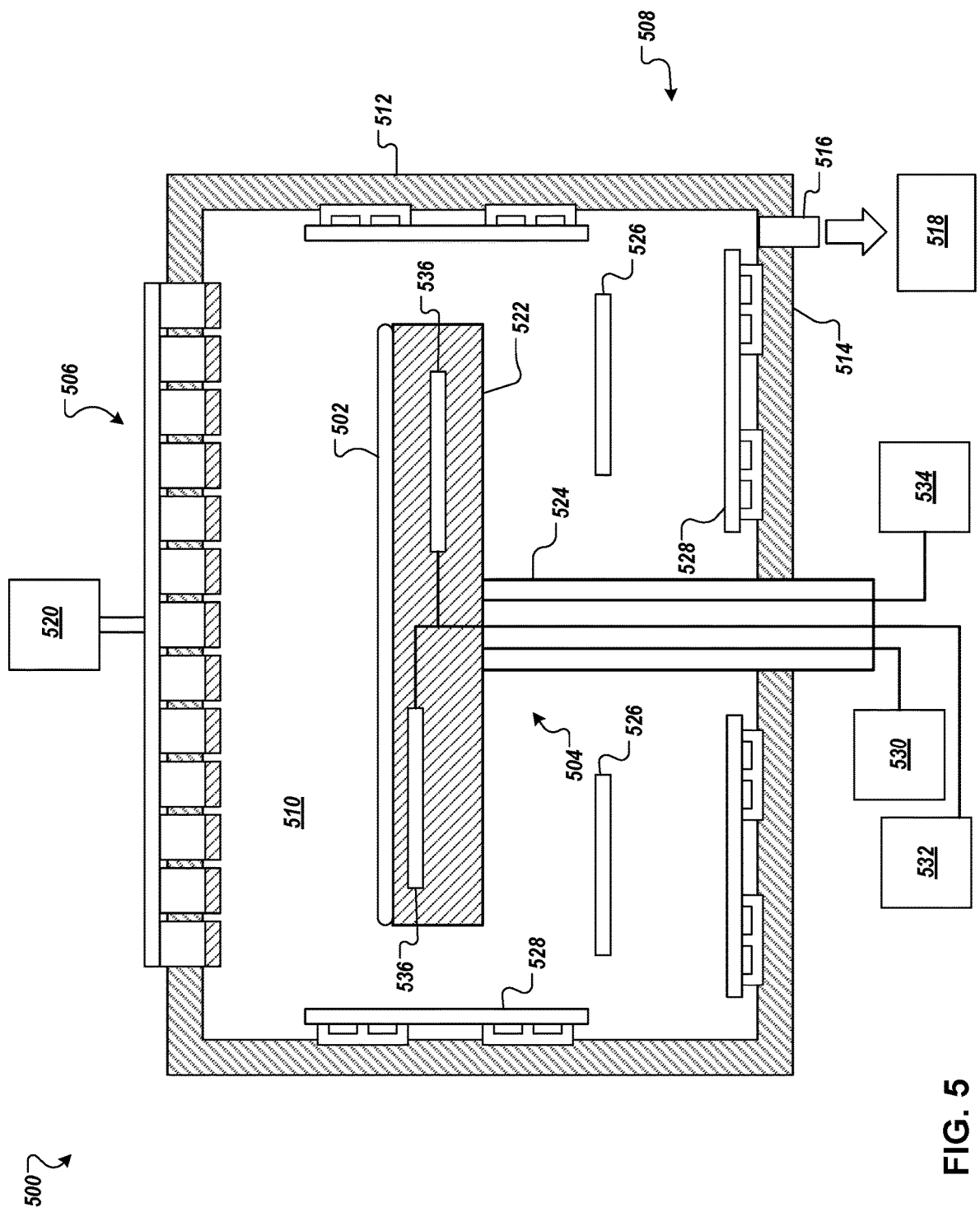
FIG. 5 depicts a sectional view of a manufacturing chamber (e.g., a semiconductor wafer manufacturing chamber) according to some embodiments.

FIG. 5 depicts a sectional view of a manufacturing chamber 500 (e.g., a semiconductor wafer manufacturing chamber), according to some embodiments. Manufacturing chamber 500 may be one or more of an etch chamber, deposition chamber (including atomic layer deposition, chemical vapor deposition, physical vapor deposition, or plasma enhanced versions thereof), anneal chamber, or the like. For example, manufacturing chamber 500 may be a chamber for a plasma etcher, a plasma cleaner, and so forth. Examples of chamber components may include a substrate support 504, a chuck (e.g., electrostatic chuck, vacuum chuck, etc.), a ring (e.g., a process kit ring), a chamber wall, a base, a showerhead 506, a gas distribution plate, a liner, a liner kit, a shield, a plasma screen, a flow equalizer, a cooling base, a chamber viewport, a chamber lid, a nozzle and so on. Quality parameters of any of these parts or others included in the chamber may be measured, used to classify the part, provided to a physics-based model to predict chamber performance, provided to a machine learning model to predict substrate performance, etc.

In one embodiment, manufacturing chamber 500 includes a chamber body 508 and a showerhead 506 that enclose an interior volume 510. In some chambers, showerhead 506 may be replaced by a lid and a nozzle. Chamber body 508 may be constructed from aluminum, stainless steel, or other suitable material. Chamber body 508 generally includes sidewalls 512 and a bottom 514.

An exhaust port 516 may be defined in chamber body 508, and may couple interior volume 510 to a pump system 518. Pump system 518 may include one or more pumps and valves utilized to evacuate and regulate the pressure of interior volume 510 of manufacturing chamber 500.

Showerhead 506 may be supported on sidewalls 512 of chamber body 508 or on a top portion of the chamber body. Showerhead 506 (or the lid, in some embodiments) may be opened to allow access to interior volume 510 of manufacturing chamber 500, and may provide a seal for manufacturing chamber 500 while closed. Gas panel 520 may be coupled to manufacturing chamber 500 to provide process or cleaning gases to interior volume 510 through showerhead 506 (or lid and nozzle). Showerhead 506 may include multiple gas delivery holes throughout. Examples of processing gases that may be used to process substrates in manufacturing chamber 500 include halogen-containing gases, such as $C_2F_6$, $SF_6$, $SiCl_4$, HBr, $NF_3$, $CF_4$, $CHF_3$, $F_2$, $Cl_2$, $CCl_4$, $BCl_3$, and $SiF_4$, among others, and other gases such as $O_2$ or $N_2O$. Examples of carrier gases include $N_2$, He, Ar, and other gases inert to process gases (e.g., non-reactive gases).

Substrate support 504 is disposed in interior volume 510 of manufacturing chamber 500 below showerhead 506. In some embodiments, substrate support 504 includes susceptor 522 and shaft 524. Substrate support 504 supports a substrate 502 during processing. In some embodiments, also disposed within manufacturing chamber 500 are one or more heaters 526 and reflectors 528.

Part quality data of any part included in the manufacturing chamber may be provided to a physics-based model, utilized to make predictions of conditions in the chamber, utilized to predict substrate performance data, etc. As an illustrative example, part quality data of substrate support 504 may be measured, provided to a physics-based model, etc. Substrate support 504 may include electronics providing power and control to electrodes disposed within substrate support 504. Substrate support 504 depicted in FIG. 5 includes an electrostatic chuck assembly, substrate supports including other components are possible and within the scope of this disclosure. Substrate support 504 may include one or more clamping electrodes (not shown). Clamping electrodes may be controlled by chucking power source 530. Chucking power source 530 may include separate outputs to each clamping electrode, to enable separate control of clamping electrodes. Only one output of chucking power source 530 (and other similarly positioned components) is shown in FIG. 5 for clarity.

Substrate support 504 may include one or more heating elements 536 disposed within the support (e.g., substrate support 504 may include an electrostatic chuck heater assembly). Embedded heating elements may be regulated by a heater power source 532. Heater power source 532 may have many of the same features as chucking power source 530. As shown in FIG. 5, heating elements 536 may be disposed at different depths within the substrate support (e.g., different distances from the surface of the substrate support). Depth of the heating elements below the surface of the substrate support is an example of a possible part quality parameter of the substrate support. Other elements (chucking electrodes, RF elements, etc.) may also be disposed at various depths beneath the surface of the substrate support. In some embodiments, heating elements 536 may be subject to separate control. The physics-based digital twin model may provide as output predictive performance data of a manufacturing chamber including substrate support 504 that may determine if substrate support 504 is to be installed in the chamber, may inform set points for the various electrodes housed in substrate support 504 to reach a target property value profile or target property value profiles during substrate processing (e.g., target temperature profile on substrate), or the like. Substrate support 504 may further include one or more radio frequency (RF) elements, controlled by RF output generator 534. RF output generator 534 and RF elements may have some features in common with chucking and heating systems of substrate support 504, as described above. Other types of electrodes may also be present within the substrate support, and are within the scope of this disclosure.

Measurements of other components of the manufacturing chamber may be used similarly to inform a physics-based model of the chamber. Dimensions, material properties, chemical properties, electrical properties, optical properties, etc., of any component of the chamber may be measured and provided to a physics-based model. The output of the physics-based model may be used to classify components, determine if components are to be installed in the chamber, update a process recipe of a process to be performed in the chamber, etc.

Figure 6:
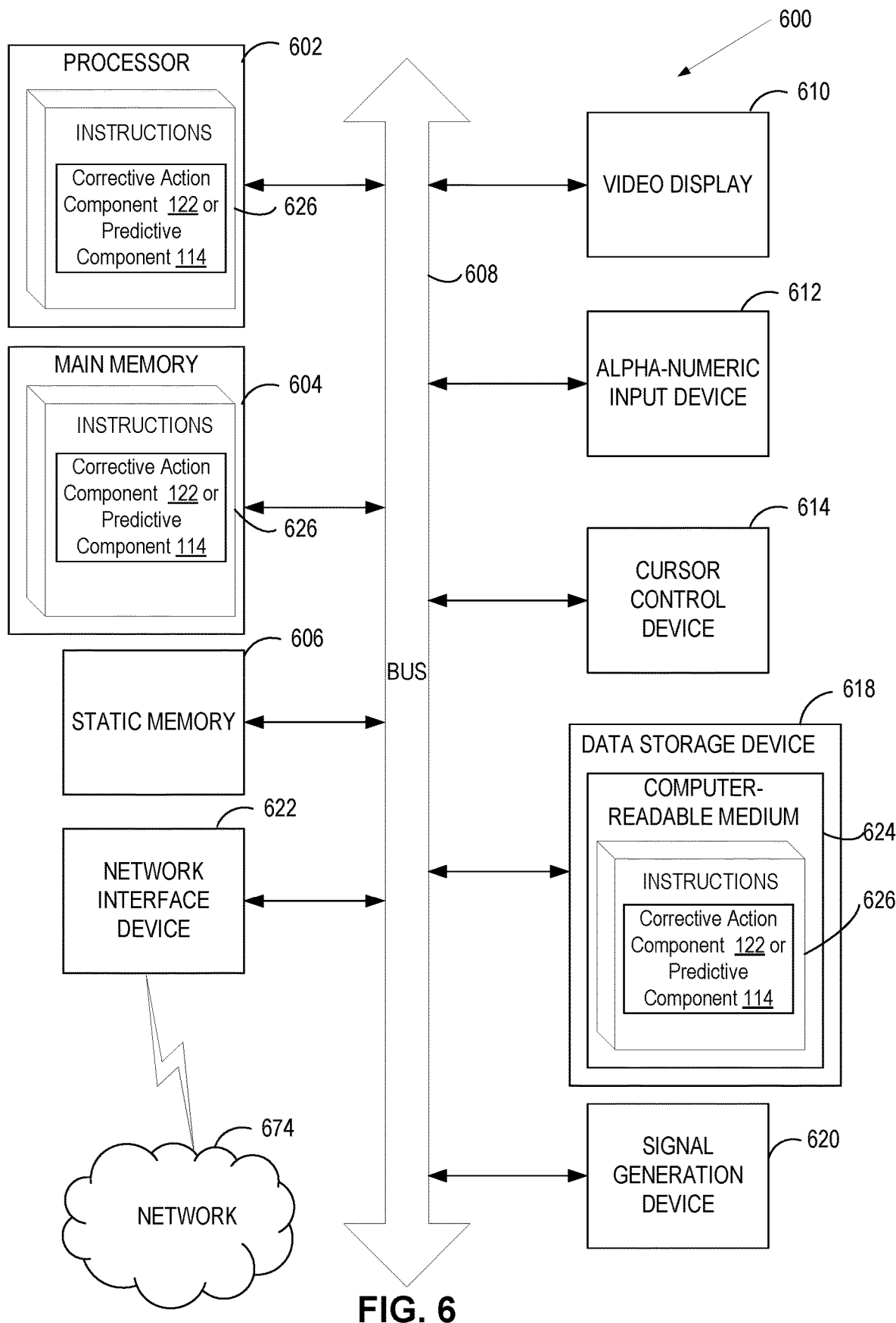
FIG. 6 is a block diagram illustrating a computer system, according to some embodiments.

FIG. 6 is a block diagram illustrating a computer system 600, according to some embodiments. In some embodiments, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 600 may include a processing device 602, a volatile memory 604 (e.g., Random Access Memory (RAM)), a non-volatile memory 606 (e.g., Read-Only Memory (ROM) or Electrically-Erasable Programmable ROM (EEPROM)), and a data storage device 618, which may communicate with each other via a bus 608.

Processing device 602 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 600 may further include a network interface device 622 (e.g., coupled to network 674). Computer system 600 also may include a video display unit 610 (e.g., an LCD), an alphanumeric input device 612 (e.g., a keyboard), a cursor control device 614 (e.g., a mouse), and a signal generation device 620.

In some implementations, data storage device 618 may include a non-transitory computer-readable storage medium 624 (e.g., non-transitory machine-readable storage medium) on which may store instructions 626 encoding any one or more of the methods or functions described herein, including instructions encoding components of FIG. 1 (e.g., predictive component 114, model(s) 190, etc.) and for implementing methods described herein.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "performing," "providing," "obtaining," "causing," "accessing," "determining," "adding," "using," "training," "generating," "identifying," "assigning," "updating," "scheduling," "correcting," or the like, refer to actions and processes performed or implemented by computer systems that manipulate and transform data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
receiving first data indicative of a first range of values of a first quality parameter describing one or more properties of a first manufacturing chamber component of a first type under consideration for installation in a manufacturing chamber, each value in the first range of values meeting one or more first threshold criteria;
receiving second data indicative of values of one or more quality parameters of one or more components installed in the manufacturing chamber, wherein the one or more components are of a second type of manufacturing chamber component;
providing the first data and second data to a physics-based model of the manufacturing chamber;
receiving, from the physics-based model, a predicted performance of the manufacturing chamber in view of the values of quality parameters of the one or more components installed in the manufacturing chamber and the values of the first quality parameter of the first manufacturing chamber component; and
determining, based on the predicted performance of the manufacturing chamber, whether the first manufacturing chamber component is to be installed in the manufacturing chamber.

2. The method of claim 1, wherein the one or more first threshold criteria comprise one or more manufacturing specifications for the first manufacturing chamber component of the first type.

3. The method of claim 1, wherein determining whether the first manufacturing chamber component of the first type is to be installed in the manufacturing chamber comprises determining whether the first manufacturing chamber component will enable the manufacturing chamber to achieve target processing conditions by utilizing fourth data indicating a relationship between the values of the first quality parameter and a first set of predicted conditions in the manufacturing chamber and fifth data indicating a value of the first quality parameter associated with the first manufacturing chamber component.

4. The method of claim 1, further comprising:
receiving first process specifications associated with a first manufacturing process;
determining a first probability that the first manufacturing chamber component will facilitate conditions in the manufacturing chamber that are in compliance with the first process specifications; and
assigning the first manufacturing chamber component a first classification category in view of the first probability.

5. The method of claim 4, further comprising:
receiving second process specifications associated with a second manufacturing process;
determining a second probability that the first manufacturing chamber component will facilitate conditions in the manufacturing chamber that are in compliance with the second process specifications; and
assigning the first manufacturing chamber component a second classification category in view of the second probability.

6. The method of claim 1, further comprising:
receiving fourth data indicative of a second range of values of a second quality parameter of the first manufacturing chamber component of the first type, each value in the second range of values meeting one or more threshold criteria;
providing the fourth data to the physics-based model of the manufacturing chamber;
receiving, from the physics-based model, fifth data indicating a relationship between the values of the second quality parameter and second predicted conditions in the manufacturing chamber; and
determining, based on the second predicted conditions, whether the first manufacturing chamber component of the first type is to be installed in the manufacturing chamber.

7. The method of claim 1, further comprising:
receiving fourth data indicative of a second range of values of a second quality parameter of a second manufacturing chamber component of a third type, each value in the second range of values meeting one or more second threshold criteria;
providing the fourth data to the physics-based model of the manufacturing chamber;
receiving, from the physics-based model, fifth data indicating a relationship between the values of the second quality parameter and second predicted conditions in the manufacturing chamber; and
determining, based on the second predicted conditions, whether the second manufacturing chamber component of the third type is to be installed in the manufacturing chamber.

8. A non-transitory computer-readable storage medium storing instructions that, when executed by a processing device, cause the processing device to perform operations comprising:
receiving first data indicative of values of one or more quality parameters describing one or more properties of one or more manufacturing chamber components installed in a manufacturing chamber, wherein the one or more manufacturing chamber components are of a first type of manufacturing chamber component;
receiving second data indicative of a first value of a first quality parameter of a new manufacturing chamber component, wherein the new manufacturing chamber component is under consideration for installation into the manufacturing chamber, and wherein the new manufacturing chamber component is of a second type of manufacturing chamber component;
providing the first data and the second data to a physics-based model;
receiving, from the physics-based model, a predicted performance of the manufacturing chamber in view of the values of the one or more quality parameters of the one or more manufacturing chamber components installed in the manufacturing chamber and the first value of the first quality parameter of the new manufacturing chamber component; and
determining, based on the predicted performance, whether the new manufacturing chamber component is to be installed in the manufacturing chamber.

9. The non-transitory computer-readable storage medium of claim 8, wherein the operations further comprise:
updating a process recipe of a process associated with the manufacturing chamber in view of the predicted performance of the manufacturing chamber.

10. The non-transitory computer-readable storage medium of claim 8, wherein the new manufacturing chamber component was pre-screened for use in a manufacturing process associated with the manufacturing chamber in view of the first value of the first quality parameter of the new manufacturing chamber component.

11. The non-transitory computer-readable storage medium of claim 8, wherein the operations further comprise:
receiving third data indicative of a second value of a second quality parameter of the new manufacturing chamber component; and
providing the third data to the physics-based model, wherein the predicted performance from the physics-based model is generated in view of the first data, the second data, and the third data.

12. A method, comprising:
receiving predicted performance data of a first manufacturing chamber as output from a first physics-based model of the first manufacturing chamber, wherein the output of the first physics-based model is generated in view of a first value of a first quality
parameter describing one or more properties of a first component of the first manufacturing chamber,
wherein the first component was installed in the first manufacturing chamber based on the output of a second physics-based model, wherein the output of the second physics-based model is a predicted performance of the first manufacturing chamber in view of the first value and values of one or more quality parameters of one or more components installed in the first manufacturing chamber, wherein the first component is of a first type of manufacturing chamber component and the one or more manufacturing chamber components are of a second type of manufacturing chamber component;
receiving measured performance data associated with the first manufacturing chamber; and
causing performance of a corrective action in view of the predicted performance data and the measured performance data.

13. The method of claim 12, wherein the output of the first physics-based model is further in view of a second value of a second quality parameter of the first component of the first manufacturing chamber.

14. The method of claim 12, wherein the output of the first physics-based model is further in view of a second value of a second quality parameter of a second component of the first manufacturing chamber.

15. The method of claim 12, wherein the first value of the first quality parameter of the first component of the first manufacturing chamber is within a manufacturing specification.

16. The method of claim 12, wherein the first component of the first manufacturing chamber was installed in the first manufacturing chamber based on a classification assigned to it in view of:
- the first value of the first quality parameter of the first component;
- process specifications of a manufacturing process associated with the first manufacturing chamber; and
- output of third physics-based model, wherein the third physics-based model is configured to predict conditions achieved in a second manufacturing chamber during the manufacturing process with the first component installed in the second manufacturing chamber.

17. The method of claim 12, further comprising:
- providing, as training input to train a machine learning model, historical performance data of the first manufacturing chamber; and
- providing, as target output to train the machine learning model, the one or more quality parameters of the one or more components installed in the first manufacturing chamber, wherein the corrective action is to be performed in view of output of the trained machine learning model.

18. The method of claim 12, wherein causing performance of a corrective action comprises:
- providing, to a trained machine learning model, performance data of the first manufacturing chamber;
- receiving, as output from the trained machine learning model, predicted values of the one or more quality parameters of the one or more components of the first manufacturing chamber; and
- identifying a corrective action to be performed in view of the output from the trained machine learning model.

* * * * *